US012025935B2

(12) United States Patent
Ishigaya et al.

(10) Patent No.: US 12,025,935 B2

(45) Date of Patent: Jul. 2, 2024

(54) HEATING DEVICE, FIXING DEVICE, AND IMAGE FORMING APPARATUS

(71) Applicants: Yasunori Ishigaya, Kanagawa (JP); Keitaro Shoji, Kanagawa (JP)

(72) Inventors: Yasunori Ishigaya, Kanagawa (JP); Keitaro Shoji, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/152,462

(22) Filed: Jan. 10, 2023

(65) Prior Publication Data

US 2023/0288852 A1 Sep. 14, 2023

(30) Foreign Application Priority Data

Mar. 9, 2022 (JP) ................................ 2022-036207

(51) Int. Cl.
*G03G 15/20* (2006.01)

(52) U.S. Cl.
CPC ................................ *G03G 15/2053* (2013.01)

(58) Field of Classification Search
CPC ................................................ G03G 15/2053
See application file for complete search history.

(56) References Cited

U.S. PATENT DOCUMENTS 9,501,012 B2 * 11/2016 Ogawa ............... G03G 15/2053
2020/0117124 A1 4/2020 Furuichi
2022/0043376 A1 2/2022 Shoji et al.
2022/0155712 A1 5/2022 Imada et al.
2022/0291615 A1 9/2022 Nanno et al.

FOREIGN PATENT DOCUMENTS

JP 2008-076857 4/2008
JP 2020-060676 4/2020
JP 2021-033025 3/2021

OTHER PUBLICATIONS

U.S. Appl. No. 17/847,589, filed Jun. 23, 2022, Keitaro Shoji, et al.
U.S. Appl. No. 17/963,195, filed Oct. 11, 2022, Yasunori Ishigaya, et al.

* cited by examiner

*Primary Examiner* — Victor Verbitsky
(74) *Attorney, Agent, or Firm* — Harness, Dickey & Pierce, P.L.C.

(57) ABSTRACT

A heating device includes a heater including a heat generation portion and a base mounting the heat generation portion. The base includes a first lateral end portion and a second lateral end portion in a longitudinal direction of the base. The first lateral end portion has a first length and the second lateral end portion has a second length that is smaller than the first length in the longitudinal direction of the base. A thermal conduction aid contacts the heater and includes a first lateral end projection and a second lateral end projection that project beyond the heat generation portion in the longitudinal direction of the base. The first lateral end projection has a first volume and the second lateral end projection has a second volume that is greater than the first volume.

20 Claims, 21 Drawing Sheets

HEATING DEVICE, FIXING DEVICE, AND IMAGE FORMING APPARATUS

CROSS-REFERENCE TO RELATED APPLICATION

This patent application is based on and claims priority pursuant to 35 U.S.C. § 119(a) to Japanese Patent Application No. 2022-036207, filed on Mar. 9, 2022, in the Japan Patent Office, the entire disclosure of which is hereby incorporated by reference herein.

BACKGROUND

Technical Field

Embodiments of this disclosure relate to a heating device, a fixing device, and an image forming apparatus.

Related Art

Related-art image forming apparatuses, such as copiers, facsimile machines, printers, and multifunction peripherals (MFP) having two or more of copying, printing, scanning, facsimile, plotter, and other functions, typically form an image on a recording medium according to image data.

Such image forming apparatuses include a heating device, for example, a fixing device that heats a sheet bearing an unfixed image, fixing the unfixed image on the sheet.

The fixing device includes a heater disposed symmetrically with respect to a center of a sheet conveyance region in a longitudinal direction of the heater where the sheet is conveyed so that the heater heats the sheet evenly. However, the fixing device further includes elements other than the heater, that may not be disposed symmetrically with respect to the center of the sheet conveyance region in the longitudinal direction of the heater due to various conditions. The heater includes a heat generator that generates heat that is conducted to peripheral elements. An amount of heat conducted to the peripheral elements may be different between one lateral end and another lateral end of the heater in the longitudinal direction thereof with respect to the center of the sheet conveyance region. Accordingly, one lateral end of the heater from which an increased amount of heat is conducted to the peripheral elements may suffer from shortage of heat that heats the sheet. Conversely, another lateral end of the heater from which a decreased amount of heat, that is smaller than the increased amount of heat, is conducted to the peripheral elements may suffer from substantial temperature increase (e.g., overheating).

SUMMARY

This specification describes below an improved heating device. In one embodiment, the heating device includes a rotator that rotates and a heater that heats the rotator. The heater includes a heat generation portion that generates heat and a base that mounts the heat generation portion. The base includes a first lateral end portion defined between one lateral end of the base and one lateral end of the heat generation portion in a longitudinal direction of the base. The first lateral end portion has a first length in the longitudinal direction of the base. The base further includes a second lateral end portion defined between another lateral end of the base and another lateral end of the heat generation portion in the longitudinal direction of the base. The second lateral end portion has a second length that is smaller than the first length of the first lateral end portion in the longitudinal direction of the base. A thermal conduction aid contacts the heater. The thermal conduction aid includes a first lateral end projection that projects beyond the heat generation portion in the longitudinal direction of the base onto the first lateral end portion of the base. The first lateral end projection has a first volume. The thermal conduction aid further includes a second lateral end projection that projects beyond the heat generation portion in the longitudinal direction of the base onto the second lateral end portion of the base. The second lateral end projection has a second volume that is greater than the first volume of the first lateral end projection.

This specification further describes an improved fixing device. In one embodiment, the fixing device includes a first rotator and a second rotator that rotate. The second rotator contacts an outer circumferential face of the first rotator to form a nip between the first rotator and the second rotator, through which a recording medium bearing an image is conveyed. A heater heats the first rotator. The heater includes a heat generation portion that generates heat and a base that mounts the heat generation portion. The base includes a first lateral end portion defined between one lateral end of the base and one lateral end of the heat generation portion in a longitudinal direction of the base. The first lateral end portion has a first length in the longitudinal direction of the base. The base further includes a second lateral end portion defined between another lateral end of the base and another lateral end of the heat generation portion in the longitudinal direction of the base. The second lateral end portion has a second length that is smaller than the first length of the first lateral end portion in the longitudinal direction of the base. A thermal conduction aid contacts the heater. The thermal conduction aid includes a first lateral end projection that projects beyond the heat generation portion in the longitudinal direction of the base onto the first lateral end portion of the base. The first lateral end projection has a first volume. The thermal conduction aid further includes a second lateral end projection that projects beyond the heat generation portion in the longitudinal direction of the base onto the second lateral end portion of the base. The second lateral end projection has a second volume that is greater than the first volume of the first lateral end projection.

This specification further describes an improved image forming apparatus. In one embodiment, the image forming apparatus includes an image forming device that forms an image and the heating device described above that heats a recording medium bearing the image.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
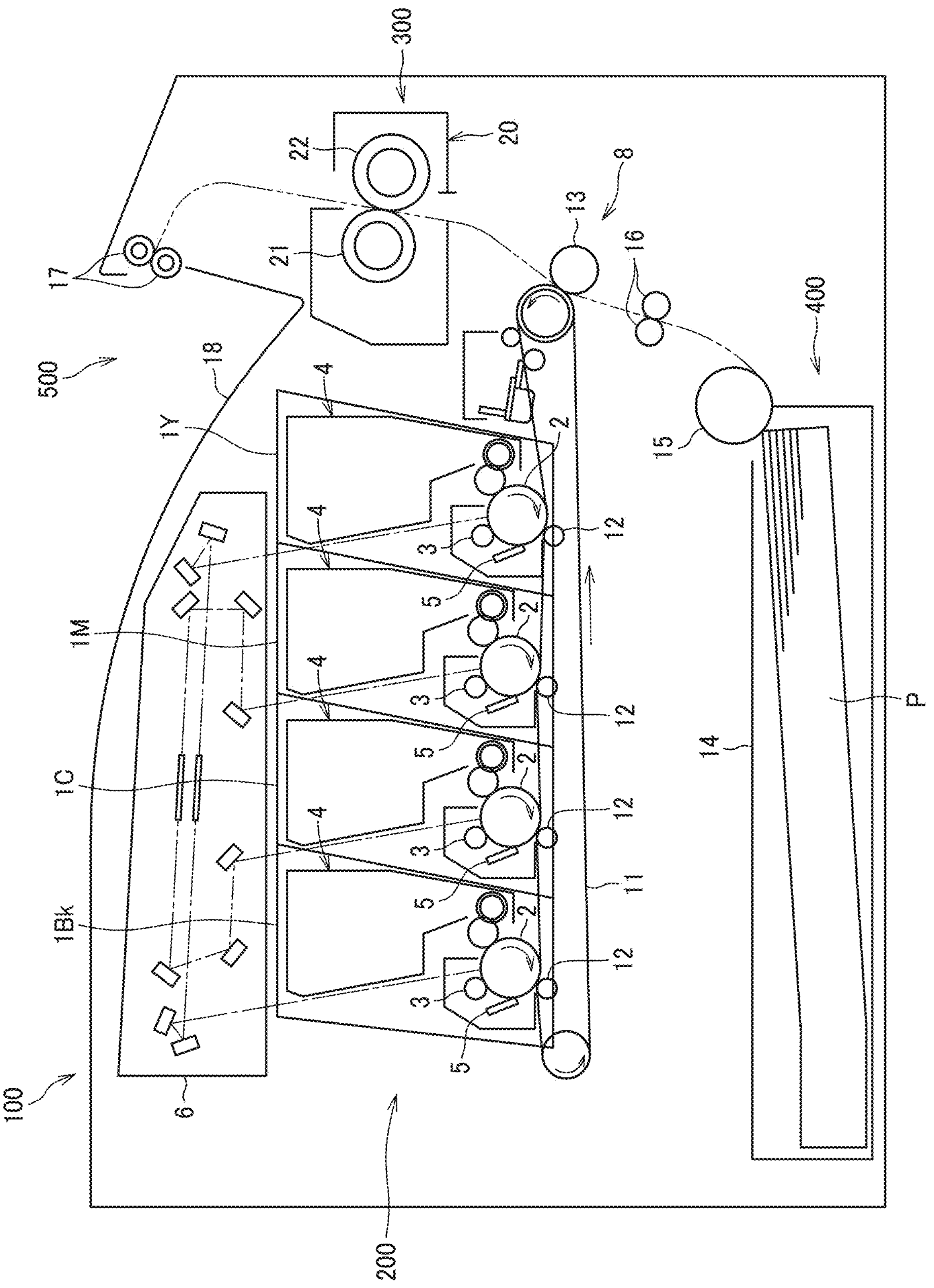
FIG. 1 is a schematic cross-sectional view of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Referring to the attached drawings, the following describes embodiments of the present disclosure. In the drawings for explaining the embodiments of the present disclosure, identical reference numerals are assigned to elements such as members and parts that have an identical function or an identical shape as long as differentiation is possible and a description of the elements is omitted once the description is provided.

FIG. 1 is a schematic cross-sectional view of an image forming apparatus 100 according to an embodiment of the present disclosure. The image forming apparatus 100 is a printer. Alternatively, the image forming apparatus 100 may be a copier, a facsimile machine, a printing machine, a multifunction peripheral (MFP) having at least two of printing, copying, facsimile, scanning, and plotter functions, or the like. Image formation described below denotes forming an image having meaning such as characters and figures and an image not having meaning such as patterns.

Referring to FIG. 1, a description is provided of an overall construction and operations of the image forming apparatus 100 according to an embodiment of the present disclosure.

As illustrated in FIG. 1, the image forming apparatus 100 according to the embodiment includes an image forming portion 200, a fixing portion 300, a recording medium supply portion 400, and a recording medium ejecting portion 500. The image forming portion 200 forms a toner image on a sheet P serving as a recording medium. The fixing portion 300 fixes the toner image on the sheet P. The recording medium supply portion 400 supplies the sheet P to the image forming portion 200. The recording medium ejecting portion 500 ejects the sheet P onto an outside of the image forming apparatus 100.

The image forming portion 200 includes four process units 1Y, 1M, 1C, and 1Bk, an exposure device 6, and a transfer device 8. Each of the process units 1Y, 1M, 1C, and 1Bk serves as an image forming unit or an image forming device and includes a photoconductor 2. The exposure device 6 forms an electrostatic latent image on the photoconductor 2 of each of the process units 1Y, 1M, 1C, and 1Bk. The transfer device 8 transfers the toner image onto the sheet P.

The process units 1Y, 1M, 1C, and 1Bk basically have similar constructions, respectively. However, the process units 1Y, 1M, 1C, and 1Bk contain toners, serving as developers, in different colors, that is, yellow, magenta, cyan, and black, respectively, which correspond to color separation components for a color image. For example, each of the process units 1Y, 1M, 1C, and 1Bk includes the photoconductor 2, a charger 3, a developing device 4, and a cleaner 5. The photoconductor 2 serves as an image bearer that bears an image (e.g., an electrostatic latent image and a toner image) on a surface of the photoconductor 2. The charger 3 charges the surface of the photoconductor 2. The developing device 4 supplies the toner as the developer to the surface of the photoconductor 2 to form a toner image. The cleaner 5 cleans the surface of the photoconductor 2.

The transfer device 8 includes an intermediate transfer belt 11, primary transfer rollers 12, and a secondary transfer roller 13. The intermediate transfer belt 11 is an endless belt that is stretched taut across a plurality of support rollers. The four primary transfer rollers 12 are disposed within a loop formed by the intermediate transfer belt 11. The primary transfer rollers 12 are pressed against the photoconductors 2, respectively, via the intermediate transfer belt 11, thus forming primary transfer nips between the intermediate transfer belt 11 and the photoconductors 2. The secondary transfer roller 13 contacts an outer circumferential surface of the intermediate transfer belt 11 to form a secondary transfer nip therebetween.

The fixing portion 300 includes a fixing device 20. The fixing device 20 includes a fixing belt 21 and a pressure roller 22. The fixing belt 21 is an endless belt. The pressure roller 22 serves as an opposed rotator that is disposed opposite the fixing belt 21. The pressure roller 22 has an outer circumferential face that contacts an outer circumferential face 21*a* depicted in FIG. 2 of the fixing belt 21 to form a nip (e.g., a fixing nip) therebetween.

The recording medium supply portion 400 includes a sheet tray 14 (e.g., a paper tray) and a feed roller 15. The sheet tray 14 loads a plurality of sheets P serving as recording media. The feed roller 15 picks up and feeds a sheet P from the sheet tray 14. According to the embodiments below, a sheet is used as a recording medium. However, the recording medium is not limited to paper as the sheet. In addition to paper as the sheet, the recording media include an overhead projector (OHP) transparency, cloth, a metal sheet, plastic film, and a prepreg sheet pre-impregnated with resin in carbon fibers. In addition to plain paper, the sheets include thick paper, a postcard, an envelope, thin paper, coated paper, art paper, and tracing paper.

The recording medium ejecting portion 500 includes an output roller pair 17 and an output tray 18. The output roller pair 17 ejects the sheet P onto the outside of the image forming apparatus 100. The output tray 18 is placed with the sheet P ejected by the output roller pair 17. The image forming apparatus 100 further includes a timing roller pair 16.

Referring to FIG. 1, a description is provided of printing processes performed by the image forming apparatus 100 according to the embodiment.

When the image forming apparatus 100 receives an instruction to start printing, a driver starts driving and rotating the photoconductor 2 of each of the process units 1Y, 1M, 1C, and 1Bk clockwise in FIG. 1 and the intermediate transfer belt 11 of the transfer device 8 counterclockwise in FIG. 1. The feed roller 15 starts rotation, feeding a sheet P from the sheet tray 14. As the sheet P fed by the feed roller 15 comes into contact with the timing roller pair 16, the timing roller pair 16 temporarily halts the sheet P. Thus, the timing roller pair 16 temporarily interrupts conveyance of the sheet P until the toner image, that is to be transferred onto the sheet P, is formed on the intermediate transfer belt 11.

The charger 3 of each of the process units 1Y, 1M, 1C, and 1Bk charges the surface of the photoconductor 2 evenly at a high electric potential. The exposure device 6 exposes the charged surfaces of the photoconductors 2, respectively, according to image data sent from a terminal. Alternatively, if the image forming apparatus 100 is a copier, the exposure device 6 exposes the charged surfaces of the photoconductors 2, respectively, according to image data created by a scanner that reads an image on an original. Accordingly, the electric potential of an exposed portion on the surface of each of the photoconductors 2 decreases, forming an electrostatic latent image on the surface of each of the photoconductors 2. The developing device 4 of each of the process units 1Y, 1M, 1C, and 1Bk supplies toner to the electrostatic latent image formed on the photoconductor 2, forming a toner image thereon. When the toner images formed on the photoconductors 2 reach the primary transfer nips defined by the primary transfer rollers 12 in accordance with rotation of the photoconductors 2, respectively, the primary transfer rollers 12 transfer the toner images formed on the photoconductors 2 onto the intermediate transfer belt 11 driven and rotated counterclockwise in FIG. 1 successively such that the toner images are superimposed on the intermediate transfer belt 11. Thus, the superimposed toner images form a full color toner image on the intermediate transfer belt 11. Alternatively, in the image forming apparatus 100, one of the four process units 1Y, 1M, 1C, and 1Bk may be used to form a monochrome toner image or two or three of the four process units 1Y, 1M, 1C, and 1Bk may be used to form a bicolor toner image or a tricolor toner image. After the toner image formed on the photoconductor 2 is transferred onto the intermediate transfer belt 11, the cleaner 5 removes residual toner and the like remaining on the photoconductor 2 therefrom.

The full color toner image formed on the intermediate transfer belt 11 is conveyed to the secondary transfer nip defined by the secondary transfer roller 13 in accordance with rotation of the intermediate transfer belt 11 and is transferred onto the sheet P conveyed by the timing roller pair 16. Thereafter, the sheet P transferred with the full color toner image is conveyed to the fixing device 20 where the fixing belt 21 and the pressure roller 22 fix the full color toner image on the sheet P under heat and pressure. The sheet P is conveyed to the recording medium ejecting portion 500 where the output roller pair 17 ejects the sheet P onto the output tray 18. Thus, a series of printing processes is finished.

Figure 2:
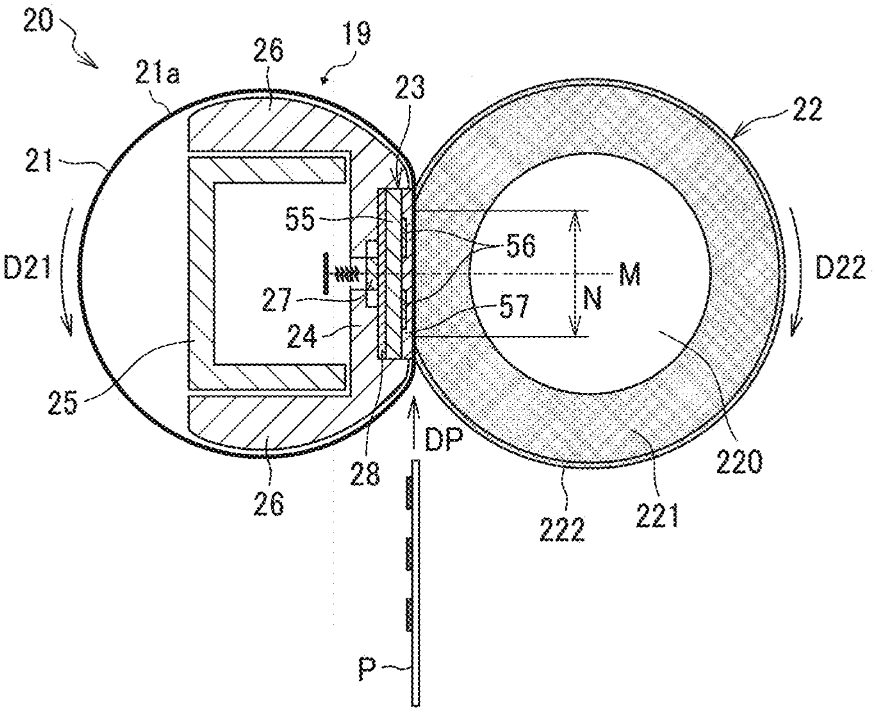
FIG. 2 is a schematic cross-sectional view of a fixing device incorporated in the image forming apparatus depicted in FIG. 1.

Referring to FIG. 2, a detailed description is provided of a construction of the fixing device 20 according to an embodiment of the present disclosure.

As illustrated in FIG. 2, in addition to the fixing belt 21 and the pressure roller 22, the fixing device 20 according to the embodiment includes a heater 23, a thermal equalization plate 28, a heater holder 24, a stay 25, guides 26, and temperature sensors 27. The fixing device 20 includes a heating device 19 that includes the fixing belt 21, the heater 23, the temperature sensors 27, and the thermal equalization plate 28.

The fixing belt 21 serves as a rotator (e.g., a first rotator or a fixing rotator) that contacts an unfixed toner image bearing side of a sheet P, which bears an unfixed toner image, and fixes the unfixed toner image (e.g., unfixed toner) on the sheet P. The fixing belt 21 rotates in a rotation direction D21. The fixing belt 21 is an endless belt that has flexibility. The fixing belt 21 has a diameter in a range of from 15 mm to 120 mm, for example. According to the embodiment, the fixing belt 21 has an inner diameter of 25 mm.

Figure 3:
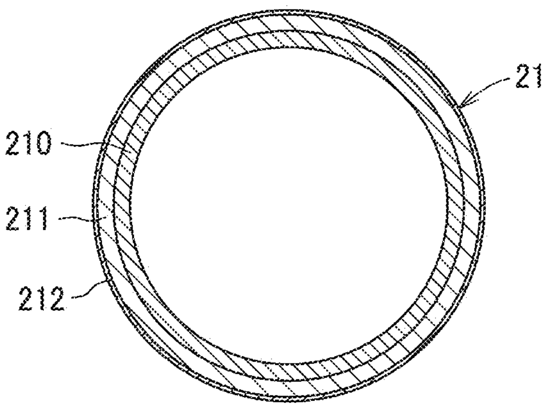
FIG. 3 is a cross-sectional view of a fixing belt incorporated in the fixing device depicted in FIG. 2.

As illustrated in FIG. 3, for example, the fixing belt 21 includes a base layer 210 serving as an inner circumferential surface layer of the fixing belt 21, an elastic layer 211 disposed on the base layer 210, and a release layer 212 disposed on the elastic layer 211 and serving as an outer circumferential surface layer of the fixing belt 21. The fixing belt 21 has a total thickness of 1 mm or smaller. The base layer 210 has a layer thickness in a range of from 30 μm to 50 μm and is made of a metal material such as nickel and stainless steel or a resin material such as polyimide. The elastic layer 211 has a layer thickness in a range of from 100 μm to 300 μm and is made of a rubber material such as silicone rubber, silicone rubber foam, and fluororubber. Since the fixing belt 21 incorporates the elastic layer 211, the elastic layer 211 prevents slight surface asperities from being produced on a surface of the fixing belt 21 at a fixing nip N formed between the fixing belt 21 and the pressure roller 22. Accordingly, heat is quickly conducted from the fixing belt 21 to the toner image on the sheet P evenly. The release layer 212 has a layer thickness in a range of from 10 μm to 50 μm. The release layer 212 is made of perfluoroalkoxy alkane (PFA), polytetrafluoroethylene (PTFE), polyimide, polyether imide, polyether sulfone (PES), or the like. As the fixing belt 21 incorporates the release layer 212, the release layer 212 facilitates separation and peeling of toner of the toner image formed on the sheet P from the fixing belt 21.

As illustrated in FIG. 2, the pressure roller 22 serves as a rotator (e.g., a second rotator or an opposed rotator) that is disposed opposite the outer circumferential face 21*a* of the fixing belt 21. The pressure roller 22 rotates in a rotation direction D22. The pressure roller 22 presses against the heater 23 via the fixing belt 21, forming the fixing nip N between the pressure roller 22 and the fixing belt 21.

The pressure roller 22 has an outer diameter of 25 mm, for example. The pressure roller 22 includes a core metal 220, an elastic layer 221, and a release layer 222. The core metal 220 is hollow and made of iron. The elastic layer 221 is disposed on an outer circumferential surface of the core metal 220. The release layer 222 is disposed on an outer circumferential surface of the elastic layer 221. The elastic layer 221 has a thickness of 3.5 mm, for example, and is made of silicone rubber or the like. The release layer 222 has a thickness of approximately 40 μm, for example, and is made of fluororesin or the like.

The heater 23 serves as a heat source that is disposed opposite an inner circumferential face of the fixing belt 21 and heats the fixing belt 21. The heater 23 is a laminated heater or a plate heater that is elongated in a longitudinal direction thereof throughout an entire span of the fixing belt 21 in a longitudinal direction or an axial direction of the fixing belt 21. The longitudinal direction of the fixing belt 21 is parallel to a width direction of the sheet P, which is perpendicular to a sheet conveyance direction DP in which the sheet P is conveyed. The heater 23 is in contact with or disposed opposite the inner circumferential face of the fixing belt 21. The heater 23 according to the embodiment includes a base 55, resistive heat generators 56 disposed on the base 55, and an insulating layer 57 that coats the resistive heat generators 56.

As illustrated in FIG. 2, according to the embodiment, the base 55 has a fixing nip opposed face that is disposed opposite the fixing nip N and mounts the resistive heat generators 56. Alternatively, the resistive heat generators 56 may be mounted on a heater holder opposed face of the base 55, that is disposed opposite the heater holder 24 via the thermal equalization plate 28 and is opposite to the fixing nip opposed face of the base 55. In this case, heat generated by the resistive heat generators 56 is conducted to the fixing belt 21 through the base 55. Hence, the base 55 is preferably made of a material having an enhanced thermal conductivity, such as aluminum nitride.

The thermal equalization plate 28 serves as a thermal conduction aid that contacts the heater 23 and conducts heat generated by the heater 23 in the longitudinal direction of the fixing belt 21, facilitating thermal equalization of the fixing belt 21. According to the embodiment, the thermal equalization plate 28 contacts an opposite face (e.g., the base 55) of the heater 23, that is opposite to a fixing nip opposed face of the heater 23, that is disposed opposite the fixing nip N. The thermal equalization plate 28 is made of a metal material having an enhanced thermal conductivity. For example, the thermal equalization plate 28 is made of copper, aluminum, silver, or the like. The thermal equalization plate 28 dissipates heat from a high temperature portion of the heater 23 to a low temperature portion of the heater 23, that is disposed in a periphery of the high temperature portion, suppressing a maximum temperature of the heater 23.

The heater holder 24 serves as a heat source holder that is disposed within a loop formed by the fixing belt 21 and holds or supports the heater 23. In addition to the heater 23, the heater holder 24 holds or supports the thermal equalization plate 28. Since the heater holder 24 is subject to a high temperature by heat from the heater 23, the heater holder 24 is preferably made of a heat-resistant material. For example, if the heater holder 24 is made of heat-resistant resin having a decreased thermal conductivity, such as liquid crystal polymer (LCP) and polyether ether ketone (PEEK), while the heater holder 24 attains heat resistance, the heater holder 24 suppresses conduction of heat thereto from the heater 23, facilitating efficient heating of the fixing belt 21.

The stay 25 serves as a support that supports the heater holder 24. The stay 25 supports an opposite face of the heater holder 24, that is opposite to a pressure roller opposed face of the heater holder 24, that is disposed opposite the pressure roller 22, throughout the entire span of the fixing belt 21 in the longitudinal direction thereof, thus preventing the heater holder 24 from being bent by pressure from the pressure roller 22. Accordingly, the fixing nip N, having an even length in the sheet conveyance direction DP throughout the entire span of the fixing belt 21 in the longitudinal direction thereof, is formed between the fixing belt 21 and the pressure roller 22. The stay 25 is preferably made of a ferrous metal material such as stainless used steel (SUS) and steel electrolytic cold commercial (SECC) to achieve rigidity.

The guides 26 contact the inner circumferential face of the fixing belt 21 and guide the fixing belt 21. Each of the guides 26 has an arc shape in cross section that is curved along the inner circumferential face of the fixing belt 21. The guides 26 are disposed upstream and downstream from the heater 23 in the rotation direction D21 of the fixing belt 21, respectively. According to the embodiment, the guides 26 are combined with the heater holder 24. Alternatively, the guides 26 may be separated from the heater holder 24.

The temperature sensor 27 serves as a temperature detector that detects a temperature of the heater 23. General temperature sensors such as a thermopile, a thermistor, and a normally closed (NC) sensor are used as the temperature sensor 27. According to the embodiment, the temperature sensor 27 is a contact type temperature sensor that contacts the thermal equalization plate 28 and is disposed opposite the heater 23 via the thermal equalization plate 28. Alternatively, the temperature sensor 27 may be a non-contact type temperature sensor that does not contact the thermal equalization plate 28.

A description is provided of operations of the fixing device 20 according to the embodiment.

As illustrated in FIG. 2, as a driver generates a driving force that drives and rotates the pressure roller 22, the driving force is transmitted from the pressure roller 22 to the fixing belt 21, rotating the fixing belt 21 in accordance with rotation of the pressure roller 22. The heater 23 heats the fixing belt 21. The temperature sensor 27 detects a temperature of the heater 23. The fixing device 20 includes a controller that controls the heater 23 to adjust a heat generation amount of the heater 23 based on the temperature of the heater 23, that is detected by the temperature sensor 27. Accordingly, the fixing belt 21 retains a temperature (e.g., a fixing temperature) at which the fixing belt 21 fixes an unfixed toner image on a sheet P properly. As the sheet P bearing the unfixed toner image is conveyed through the fixing nip N formed between the fixing belt 21 and the pressure roller 22, the fixing belt 21 and the pressure roller 22 fix the unfixed toner image on the sheet P under heat and pressure.

Figure 4:
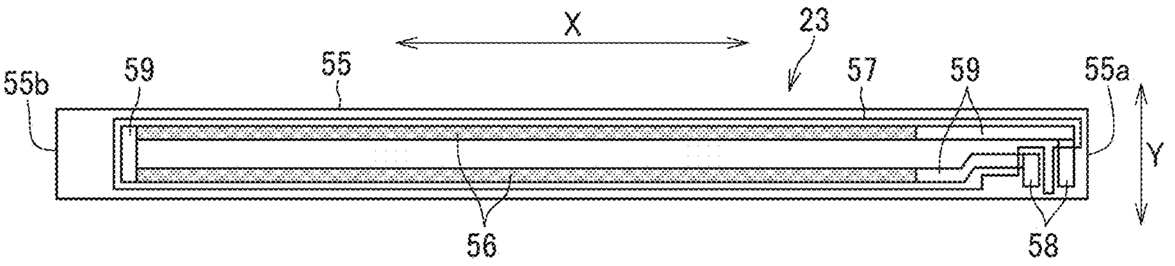
FIG. 4 is a plan view of a heater incorporated in the fixing device depicted in FIG. 2.

FIG. 4 is a plan view of the heater 23 according to the embodiment.

As illustrated in FIG. 4, the heater 23 according to the embodiment includes the base 55 that is platy and elongated in one direction (e.g., a longitudinal direction X). The base 55 is installed in the fixing device 20 such that the longitudinal direction X of the base 55 is parallel to the longitudinal direction of the fixing belt 21 or an axial direction of the pressure roller 22. The base 55 has a mounting face that mounts the two resistive heat generators 56 that are extended in the longitudinal direction X of the base 55 and arranged in line with each other in a short direction Y of the base 55. The short direction Y is perpendicular to the longitudinal direction X of the base 55 and extends along the mounting face of the base 55, that mounts the resistive heat generators 56.

As illustrated in FIG. 4, the heater 23 further includes a pair of electrodes 58 that is disposed on one lateral end portion of the base 55 in the longitudinal direction X thereof. The heater 23 further includes a plurality of feeders 59 through which the electrodes 58 are electrically connected to the resistive heat generators 56, respectively. Each of the resistive heat generators 56 has one lateral end that is electrically connected to the electrode 58. The heater 23 further includes another feeder 59 through which another lateral end of one of the resistive heat generators 56 in the longitudinal direction X of the base 55 is electrically connected to another lateral end of another one of the resistive heat generators 56. The insulating layer 57 covers and insulates the resistive heat generators 56 and the feeders 59. Conversely, the insulating layer 57 does not cover and does expose the electrodes 58 so that the electrodes 58 are electrically connected to a connector serving as a power supply terminal described below.

The base 55 is made of a material that improves heat resistance and insulation such as ceramics (e.g., alumina and aluminum nitride), glass, mica, and polyimide. The base 55 may be constructed of a metal layer made of a conductive material such as stainless used steel (SUS), iron, and aluminum and an insulating layer mounted on the metal layer. For example, if the base 55 is made of a material having an enhanced thermal conductivity such as aluminum, copper, silver, graphite, and graphene, the base 55 improves evenness of heat generated by the heater 23 in the longitudinal direction thereof, thus enhancing quality of an image formed on a sheet P. The insulating layer 57 is made of a material that improves heat resistance and insulation such as ceramics (e.g., alumina and aluminum nitride), glass, mica, and polyimide. For example, each of the resistive heat generators 56 is produced as below. Silver-palladium (AgPd), glass powder, and the like are mixed into paste. The paste coats the base 55 by screen printing or the like. Thereafter, the base 55 is subject to firing. Alternatively, each of the resistive heat generators 56 may be made of a resistive material such as a silver alloy (AgPt) and ruthenium oxide ($RuO_2$). The electrodes 58 and the feeders 59 are made of a material prepared with silver (Ag) or silver-palladium (AgPd) by screen printing or the like.

Figure 5:
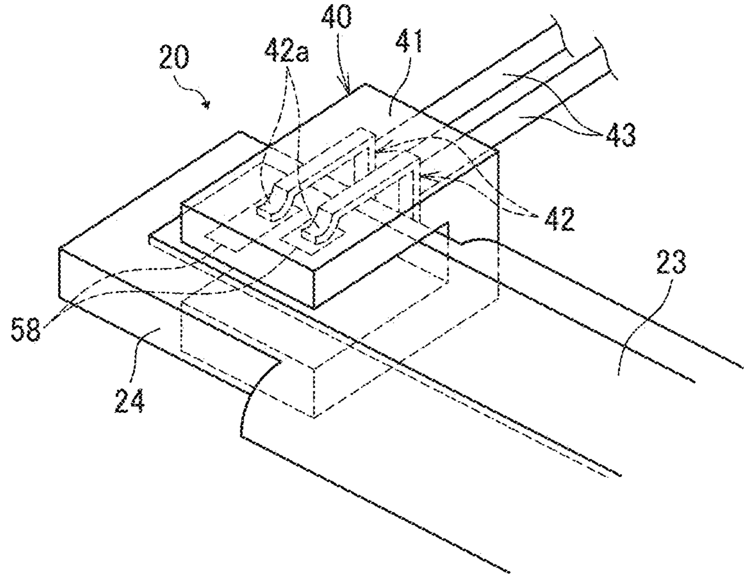
FIG. 5 is a perspective view of a connector attached to the heater depicted in FIG. 4.

FIG. 5 is a perspective view of the fixing device 20 that further includes a connector 40 that is coupled with the heater 23. The connector 40 serves as a feeding member.

As illustrated in FIG. 5, the connector 40 includes a housing 41 made of resin, a plurality of contact terminals 42 anchored to the housing 41, and a plurality of harnesses 43 coupled with the plurality of contact terminals 42, respectively. The harnesses 43 supply power. Each of the contact terminals 42 includes a resiliently deformable member such as a flat spring.

As illustrated in FIG. 5, the connector 40 is attached to the heater 23 and the heater holder 24 such that the connector 40 sandwiches the heater 23 and the heater holder 24 together. Thus, the connector 40 supports or holds the heater 23 and the heater holder 24 together. Each of the contact terminals 42 includes a contact 42*a* disposed at a tip of the contact terminal 42. In a state in which the connector 40 holds the heater 23 and the heater holder 24, as the contacts 42*a* resiliently contact and press against the corresponding electrodes 58, respectively, the contact terminals 42 are electrically connected to the electrodes 58, respectively. Accordingly, the connector 40 is electrically connected to a power supply disposed in the image forming apparatus 100, allowing the power supply to supply power to the resistive heat generators 56 of the heater 23 through the connector 40.

A description is provided of a construction of a comparative heating device.

The comparative heating device includes a heater including a heat generator having one lateral end portion in a longitudinal direction of the heater, that generates heat in a first heat generation amount per unit area, and another lateral end portion in the longitudinal direction of the heater, that generates heat in a second heat generation amount per unit area that is different from the first heat generation amount per unit area. The first heat generation amount per unit area of one lateral end portion of the heat generator, which has a high temperature, is smaller than the second heat generation amount per unit area of another lateral end portion of the heat generator, which has a low temperature, thus suppressing uneven temperature of the comparative heating device.

However, as described above, if the first heat generation amount per unit area of one lateral end portion of the heat generator is different from the second heat generation amount per unit area of another lateral end portion of the heat generator, when the heat generator generates heat in a maximum heat generation amount, the comparative heating device may suffer from notable unevenness in temperature. For example, the comparative heating device may have an overheated region where the heat generator generates heat in an increased heat generation amount. In the overheated region, the heater and heated elements heated by the heater may suffer from notable thermal expansion locally, resulting in breakage of parts. Hence, even if the first heat generation amount per unit area of one lateral end portion of the heat generator is different from the second heat generation amount per unit area of another lateral end portion of the heat generator, the comparative heating device may not suppress uneven temperature properly.

Figure 6:
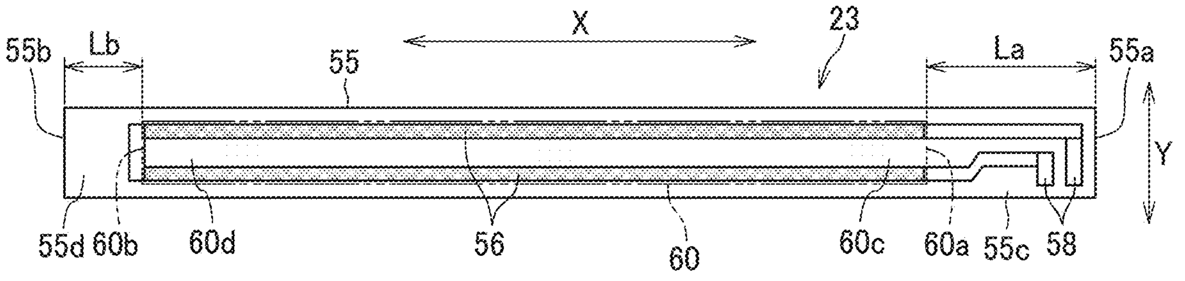
FIG. 6 is a plan view of the heater depicted in FIG. 4, illustrating a heat generation portion thereof.

As illustrated in FIG. 6, the heater 23 according to the embodiment incorporates the electrodes 58 that are disposed on one lateral end portion of the base 55 in the longitudinal direction X thereof. No electrode 58 is disposed on another lateral end portion of the base 55 in the longitudinal direction X thereof. Hence, the base 55 secures space where the electrodes 58 are situated at one lateral end portion of the base 55 in the longitudinal direction X thereof. The space where the electrodes 58 are situated elongates the base 55 at one lateral end portion of the base 55 in the longitudinal direction X thereof. For example, according to the embodiment, the electrodes 58 are disposed on one lateral end portion of the base 55 in the longitudinal direction X thereof. The heater 23 further includes a heat generation portion 60 including an electrode side end 60*a* that is disposed in proximity to the electrodes 58 and a non-electrode side end 60*b* that is not disposed in proximity to the electrodes 58. The base 55 includes a mounting portion 55*c* that mounts the electrodes 58 and has an electrode side end 55*a* that is disposed in proximity to the electrodes 58 and a non-mounting portion 55*d* that does not mount the electrodes 58 and has a non-electrode side end 55*b* that is not disposed in proximity to the electrodes 58. The mounting portion 55*c* has a length La defined between the electrode side end 60*a* of the heat generation portion 60 and the electrode side end 55*a* of the base 55. The non-mounting portion 55*d* has a length Lb defined between the non-electrode side end 60*b* of the heat generation portion 60 and the non-electrode side end 55*b* of the base 55. The length La is greater than the length Lb in the longitudinal direction X of the base 55. The heat generation portion 60 defines a region where the resistive heat generators 56 are disposed on the base 55. The heat generation portion 60 does not define a region where the single resistive heat generator 56 is disposed on the base 55. The heat generation portion 60 defines a region from an outermost lateral end of the resistive heat generators 56 on the base 55 to another outermost lateral end of the resistive heat generators 56 on the base 55. The above-described definition of the heat generation portion 60 is also applied to a heat generation portion described below.

As described above, with a configuration in which the base 55 of the heater 23 is elongated outboard from the heat generation portion 60 in one lateral end portion (e.g., the mounting portion 55*c* of the base 55) of the heater 23 in the longitudinal direction X thereof, when the resistive heat generators 56 of the heater 23 generate heat, the heat is conducted to the mounting portion 55*c* of the base 55 in an amount greater than an amount of heat conducted to the non-mounting portion 55*d* having the length Lb smaller than the length La of the mounting portion 55*c*. That is, the amount of heat conducted to the mounting portion 55*c* that mounts the electrodes 58 is greater than the amount of heat conducted to the non-mounting portion 55*d*. Accordingly, an electrode side portion 60*c* of the heat generation portion 60, that abuts on the electrode side end 60*a*, is more subject to temperature decrease than a non-electrode side portion 60*d* of the heat generation portion 60, that abuts on the non-electrode side end 60*b*. For example, when the image forming apparatus 100 is powered on and the fixing device 20 is warmed up, the fixing device 20 has a low temperature. Hence, the temperature of the electrode side portion 60*c* of the heat generation portion 60, that abuts on the electrode side end 60*a*, does not increase easily. Accordingly, if the fixing belt 21 suffers from uneven temperature, the fixing belt 21 may not heat a sheet P that is conveyed through the fixing nip N uniformly. To address this circumstance, according to embodiments of the present disclosure, in order to suppress the above-described uneven temperature of the fixing device 20, solutions described below are employed.

Figure 7:
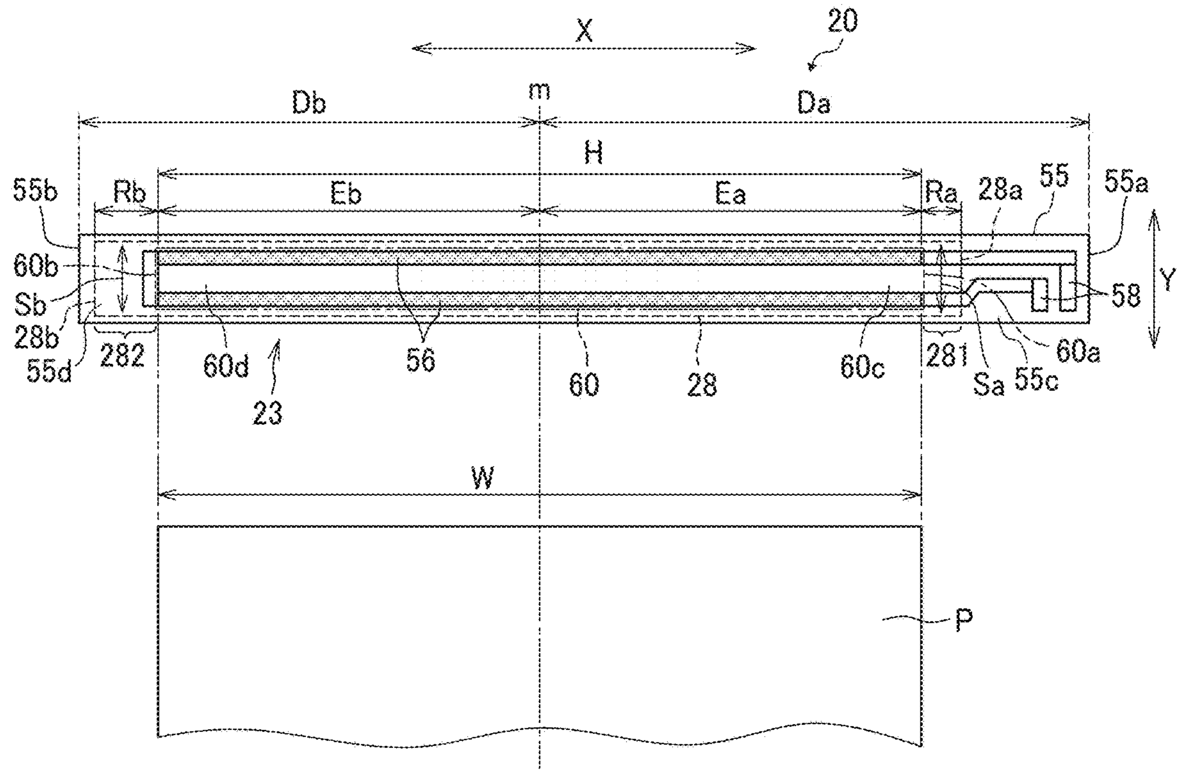
FIG. 7 is a plan view of the fixing device according to a first embodiment of the present disclosure depicted in FIG. 2.
Figure 8:
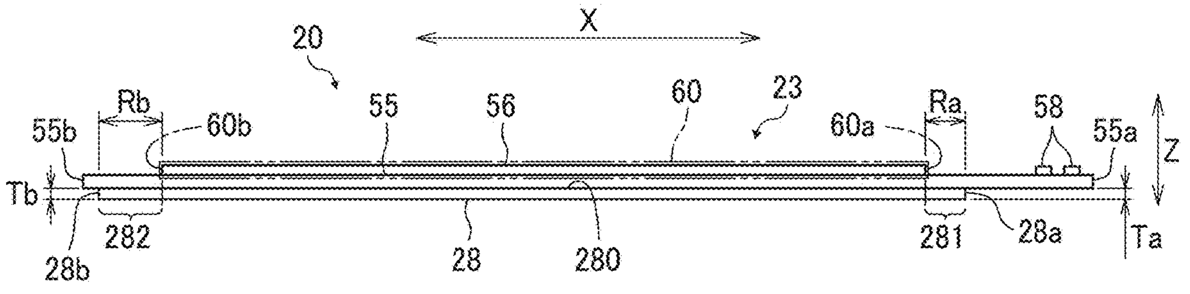
FIG. 8 is a side view of the fixing device according to the first embodiment of the present disclosure depicted in FIG. 7.

FIGS. 7 and 8 illustrate a construction of the fixing device 20 according to a first embodiment of the present disclosure. FIG. 7 is a plan view of the fixing device 20, illustrating the heater 23 and the thermal equalization plate 28 seen in a thickness direction Z, that is, an orthogonal direction perpendicular to a contact face 280 of the thermal equalization plate 28 illustrated in FIG. 8, that contacts the heater 23. FIG. 8 is a side view of the fixing device 20, illustrating the heater 23 and the thermal equalization plate 28 seen in the short direction Y of the base 55 depicted in FIG. 7. FIGS. 7 and 8 omit illustration of the fixing belt 21, the pressure roller 22, and other elements of the fixing device 20.

As illustrated in FIG. 7, in order to cause the heat generation portion 60 of the heater 23 to heat a sheet P of any size evenly throughout an entire span of the sheet Pin the width direction thereof (e.g., a direction perpendicular to the sheet conveyance direction DP depicted in FIG. 2 along a paper surface), the heat generation portion 60 of the heater 23 has a length not smaller than a maximum sheet conveyance span W (e.g., a maximum sheet conveyance region) in the longitudinal direction X of the heater 23, where a sheet P having a maximum width is conveyed. The heat generation portion 60 is symmetrical with respect to a center m of the maximum sheet conveyance span W in the width direction of the sheet P, that is, the longitudinal direction X of the heater 23. For example, the maximum sheet conveyance span W has a length Ea from the center m to the electrode side end 60*a* of the heat generation portion 60 in the width direction of the sheet P and a length Eb from the center m to the non-electrode side end 60*b* of the heat generation portion 60 in the width direction of the sheet P. The length Ea is equal to the length Eb (Ea=Eb). The fixing device 20 according to the embodiment employs a center reference conveyance system in which sheets P having different widths, respectively, are centered at a center on the fixing belt 21 in the longitudinal direction thereof while the sheets P are conveyed over the fixing belt 21. Hence, the center m of the maximum sheet conveyance span W also defines a center of a sheet conveyance span of a sheet P having a width other than the maximum width in the width direction of the sheet P.

The base 55 of the heater 23 has the mounting portion 55*c* that mounts the electrodes 58 and is greater than the non-mounting portion 55*d* in the longitudinal direction X of the heater 23. The base 55 is asymmetrical with respect to the center m of the maximum sheet conveyance span W in the width direction of the sheet P, that is, the longitudinal direction X of the heater 23. For example, the base 55 has a length Da from the center m of the maximum sheet conveyance span W to the electrode side end 55*a* of the base 55 in the longitudinal direction X of the heater 23 and a length db from the center m of the maximum sheet conveyance span W to the non-electrode side end 55*b* of the base 55 in the longitudinal direction X of the heater 23. The length Da is greater than the length db (Da>db). Hence, as described above, an amount of heat conducted from the heat generation portion 60 to the mounting portion 55*c* of the base 55 is greater than an amount of heat conducted from the heat generation portion 60 to the non-mounting portion 55*d* of the base 55.

According to the embodiment, the thermal equalization plate 28 conducts heat generated by the heater 23 in the longitudinal direction of the fixing belt 21. The thermal equalization plate 28 extends continuously in the longitudinal direction X of the heater 23 such that the thermal equalization plate 28 spans at least a heat generation span H of the heater 23. Hence, as the heat generation portion 60 (e.g., the resistive heat generators 56) generates heat, the thermal equalization plate 28 conducts the heat generated by the heat generation portion 60 in the longitudinal direction X of the base 55. According to the embodiment, the thermal equalization plate 28 protrudes beyond the heat generation portion 60 (e.g., the resistive heat generators 56) onto the mounting portion 55*c* and the non-mounting portion 55*d* of the base 55 in the longitudinal direction X of the base 55. Accordingly, heat generated by the heat generation portion 60 is conducted to the mounting portion 55*c* and the non-mounting portion 55*d* of the base 55 through the thermal equalization plate 28. An amount of heat conducted to the thermal equalization plate 28 affects a temperature profile of the heater 23 and the fixing belt 21. Hence, if the amount of heat conducted to the thermal equalization plate 28 is adjusted in the mounting portion 55*c* and the non-mounting portion 55*d* of the base 55, the temperature profile of the heater 23 and the fixing belt 21 are adjusted. In view of the circumstance, according to the embodiment, the thermal equalization plate 28 has a thermal capacity adjusted as described below. The thermal equalization plate 28 includes an electrode side projection 281 and a non-electrode side projection 282. The electrode side projection 281 projects beyond the heat generation portion 60 onto the mounting portion 55*c* of the base 55, that mounts the electrodes 58, in the longitudinal direction X of the heater 23. The non-electrode side projection 282 projects beyond the heat generation portion 60 onto the non-mounting portion 55*d* of the base 55, that does not mount the electrodes 58, in the longitudinal direction X of the heater 23. The electrode side projection 281 and the non-electrode side projection 282 have thermal capacities adjusted as described below, respectively.

A thermal capacity of an object is proportional to a mass or a volume of the object. Hence, according to the embodiment, a volume of the electrode side projection 281 of the thermal equalization plate 28 is smaller than a volume of the non-electrode side projection 282 of the thermal equalization plate 28. Thus, according to the embodiment, as illustrated in FIG. 7, a length Ra of the electrode side projection 281 is smaller than a length Rb of the non-electrode side projection 282 (Ra<Rb) in the longitudinal direction X of the base 55. Conversely, a width Sa of the electrode side projection 281 is equal to a width Sb of the non-electrode side projection 282 (Sa=Sb) in the short direction Y of the base 55. As illustrated in FIG. 8, a thickness Ta of the electrode side projection 281 is also equal to a thickness Tb of the non-electrode side projection 282 (Ta=Tb) in the thickness direction Z of the base 55.

The length Ra of the electrode side projection 281 and the length Rb of the non-electrode side projection 282 define lengths in a longitudinal direction of the thermal equalization plate 28 that is parallel to the longitudinal direction X of the base 55, respectively. For example, the length Ra of the electrode side projection 281 defines a length from the electrode side end 60*a* of the heat generation portion 60 to an electrode side end 28*a* of the thermal equalization plate 28 in the longitudinal direction X of the base 55. The length Rb of the non-electrode side projection 282 defines a length from the non-electrode side end 60*b* of the heat generation portion 60 to a non-electrode side end 28*b* of the thermal equalization plate 28 in the longitudinal direction X of the base 55. The width Sa of the electrode side projection 281 and the width Sb of the non-electrode side projection 282 define widths in the short direction Y of the base 55, respectively. The thickness Ta of the electrode side projection 281 and the thickness Tb of the non-electrode side projection 282 define thicknesses in the thickness direction Z of the base 55, respectively. The thickness direction Z is perpendicular to the longitudinal direction X and the short direction Y of the base 55. In other words, the thicknesses Ta and Tb define thicknesses in the thickness direction Z perpendicular to the mounting face of the base 55, that mounts the resistive heat generators 56.

As described above, according to the embodiment, the electrode side projection 281 of the thermal equalization plate 28 is smaller than the non-electrode side projection 282 in the longitudinal direction X of the base 55. Accordingly, in a plan view of the thermal equalization plate 28 illustrated in FIG. 7, an area of the electrode side projection 281 is smaller than an area of the non-electrode side projection 282. Hence, according to the embodiment, the volume (e.g., the thermal capacity) of the electrode side projection 281 is smaller than the volume (e.g., the thermal capacity) of the non-electrode side projection 282. Accordingly, an amount of heat conducted from the heater 23 to the electrode side projection 281 of the thermal equalization plate 28, that is disposed on the mounting portion 55*c*, is smaller than an amount of heat conducted from the heater 23 to the non-electrode side projection 282 of the thermal equalization plate 28, that is disposed on the non-mounting portion 55*d*. Thus, the thermal equalization plate 28 suppresses temperature decrease in the electrode side portion 60*c* of the heat generation portion 60, that abuts on the electrode side end 60*a*. For example, as illustrated in FIG. 6, according to the embodiment, the length La of the mounting portion 55*c* is greater than the length Lb of the non-mounting portion 55*d* in the longitudinal direction X of the base 55 (La>Lb). Hence, an amount of heat conducted from the heat generation portion 60 to the mounting portion 55*c* is greater than an amount of heat conducted from the heat generation portion 60 to the non-mounting portion 55*d*. To address this circumstance, as illustrated in FIG. 8, the length Ra of the electrode side projection 281 of the thermal equalization plate 28 is smaller than the length Rb of the non-electrode side projection 282 in the longitudinal direction X of the thermal equalization plate 28 (Ra<Rb). Accordingly, an amount of heat conducted from the heat generation portion 60 to the mounting portion 55*c* through the thermal equalization plate 28 is smaller than an amount of heat conducted from the heat generation portion 60 to the non-mounting portion 55*d* through the thermal equalization plate 28. Thus, the thermal equalization plate 28 balances an amount of heat between the electrode side portion 60*c* and the non-electrode side portion 60*d* of the heat generation portion 60. Consequently, according to the embodiment, the fixing device 20 suppresses uneven temperature. The thermal equalization plate 28 suppresses temperature decrease in the electrode side portion 60*c* of the heat generation portion 60 and overheating in the non-electrode side portion 60*d* of the heat generation portion 60, thus improving quality of a toner image fixed on a sheet P.

According to the embodiment, since the thermal equalization plate 28 has the lengths Ra and Rb that are adjusted, the fixing device 20 suppresses uneven temperature. Hence, unlike the comparative heating device described above, the fixing device 20 does not have a configuration in which a first heat generation amount per unit area of one lateral end portion of the heat generation portion 60 of the heater 23 in the longitudinal direction X thereof is different from a second heat generation amount per unit area of another lateral end portion of the heat generation portion 60 of the heater 23 in the longitudinal direction X thereof. Accordingly, the fixing device 20 is immune from adverse effects caused by the first heat generation amount per unit area and the second heat generation amount per unit area that is different from the first heat generation amount per unit area. For example, the adverse effects include uneven temperature caused by the resistive heat generators 56 that generate heat in a maximum heat generation amount and breakage of parts caused by local thermal expansion of the parts. Consequently, the fixing device 20 according to the embodiment also improves reliability.

As illustrated in FIGS. 7 and 8, the fixing device 20 includes the single thermal equalization plate 28 that extends continuously in the longitudinal direction X of the heater 23 such that the thermal equalization plate 28 spans at least the heat generation span H of the heater 23. Alternatively, the fixing device 20 may include a plurality of thermal equalization plates 28 serving as a plurality of thermal conductors or a plurality of thermal conduction aids. In this case, a gap may be provided between the adjacent thermal equalization plates 28 in the longitudinal direction X of the base 55. For example, the thermal equalization plate 28 includes at least the electrode side projection 281 and the non-electrode side projection 282. The electrode side projection 281 is disposed on the mounting portion 55*c* and is disposed outboard from the heat generation span H in the longitudinal direction X of the base 55. The non-electrode side projection 282 is disposed on the non-mounting portion 55*d* and is disposed outboard from the heat generation span H in the longitudinal direction X of the base 55. Accordingly, the thermal equalization plate 28 extends throughout an entire span including the heat generation span H in the longitudinal direction X of the base 55. Alternatively, the thermal equalization plate 28 may be disposed partially in the heat generation span H in the longitudinal direction X of the base 55.

A description is provided of embodiments of the present disclosure, that are different from the first embodiment described above.

Hereinafter, the embodiments are described mainly of configurations that are different from a configuration of the first embodiment described above. A description of other configurations that are basically common to the configuration of the first embodiment described above is omitted properly.

Figure 9:
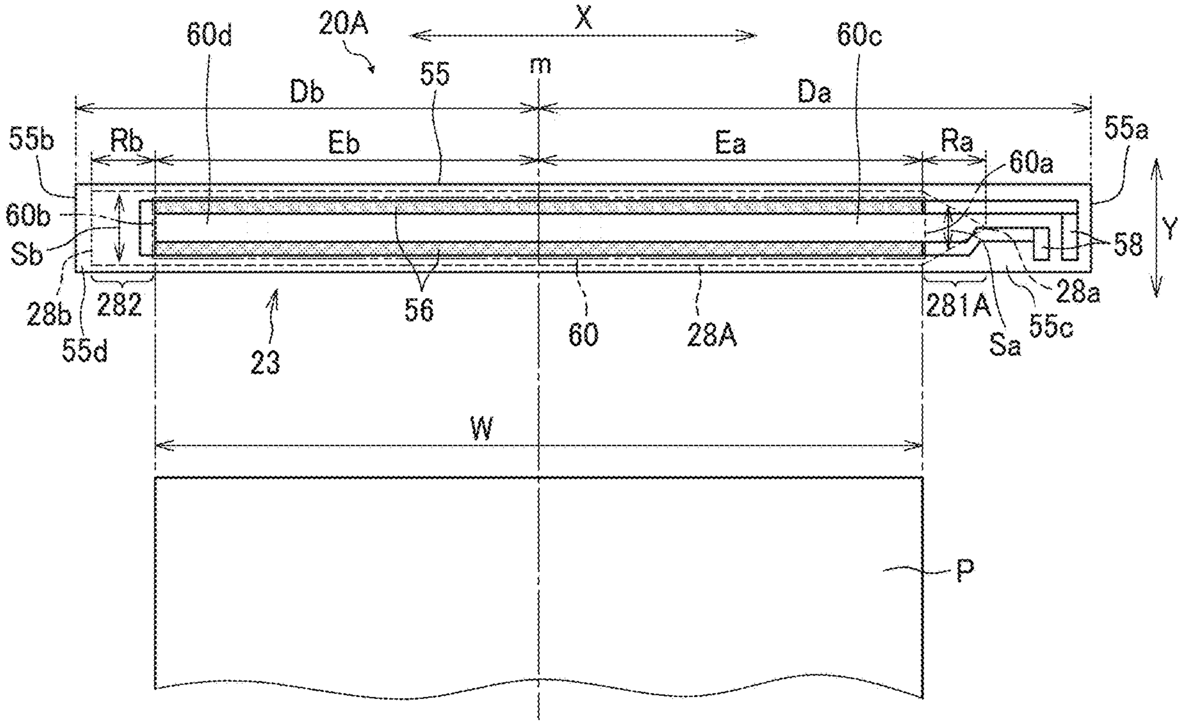
FIG. 9 is a plan view of a fixing device according to a second embodiment of the present disclosure, that is installable in the image forming apparatus depicted in FIG. 1, illustrating an electrode side projection incorporated in the fixing device.

FIG. 9 illustrates a construction of a fixing device 20A according to a second embodiment of the present disclosure.

Unlike the fixing device 20 described above with reference to FIG. 7, the fixing device 20A according to the second embodiment illustrated in FIG. 9 includes a thermal equalization plate 28A including an electrode side projection 281A that is triangular in a plan view. The electrode side projection 281A has a width Sa that decreases gradually compared to a width Sb of the non-electrode side projection 282 (Sa<Sb). Hence, according to the second embodiment, an area of the electrode side projection 281A is smaller than an area of the non-electrode side projection 282 in the plan view. Conversely, according to the second embodiment, the length Ra and the thickness Ta of the electrode side projection 281A are equal to the length Rb and the thickness Tb of the non-electrode side projection 282, respectively, (Ra=Rb, Ta=Tb).

As described above, according to the second embodiment, as the width Sa of the electrode side projection 281A is smaller than the width Sb of the non-electrode side projection 282, the area of the electrode side projection 281A is smaller than the area of the non-electrode side projection 282. Hence, a volume (e.g., a thermal capacity) of the electrode side projection 281A is smaller than a volume (e.g., a thermal capacity) of the non-electrode side projection 282. Accordingly, according to the second embodiment also, like in the first embodiment described above, an amount of heat conducted from the heat generation portion 60 to the mounting portion 55*c* through the thermal equalization plate 28A is smaller than an amount of heat conducted from the heat generation portion 60 to the non-mounting portion 55*d* through the thermal equalization plate 28A. Thus, the thermal equalization plate 28A balances an amount of heat between the electrode side portion 60*c* and the non-electrode side portion 60*d* of the heat generation portion 60. Consequently, the fixing device 20A according to the second embodiment also suppresses uneven temperature. The thermal equalization plate 28A suppresses temperature decrease in the electrode side portion 60*c* of the heat generation portion 60 and overheating in the non-electrode side portion 60*d* of the heat generation portion 60, thus improving quality of a toner image fixed on a sheet P. The fixing device 20A according to the second embodiment also does not have the configuration in which the first heat generation amount per unit area of one lateral end portion of the heat generation portion 60 of the heater 23 in the longitudinal direction X thereof is different from the second heat generation amount per unit area of another lateral end portion of the heat generation portion 60 of the heater 23 in the longitudinal direction X thereof. Accordingly, the fixing device 20A is immune from adverse effects caused by the first heat generation amount per unit area and the second heat generation amount per unit area that is different from the first heat generation amount per unit area. For example, the adverse effects include uneven temperature caused by the resistive heat generators 56 that generate heat in the maximum heat generation amount and breakage of parts caused by local thermal expansion of the parts.

In the fixing device 20A depicted in FIG. 9, the width Sa of the electrode side projection 281A decreases gradually toward the electrodes 58. The electrode side projection 281A is triangular in the plan view. Alternatively, the electrode side projection 281A may have a width Sa and a shape that are not limited to the width Sa and the shape described above.

Figure 10:
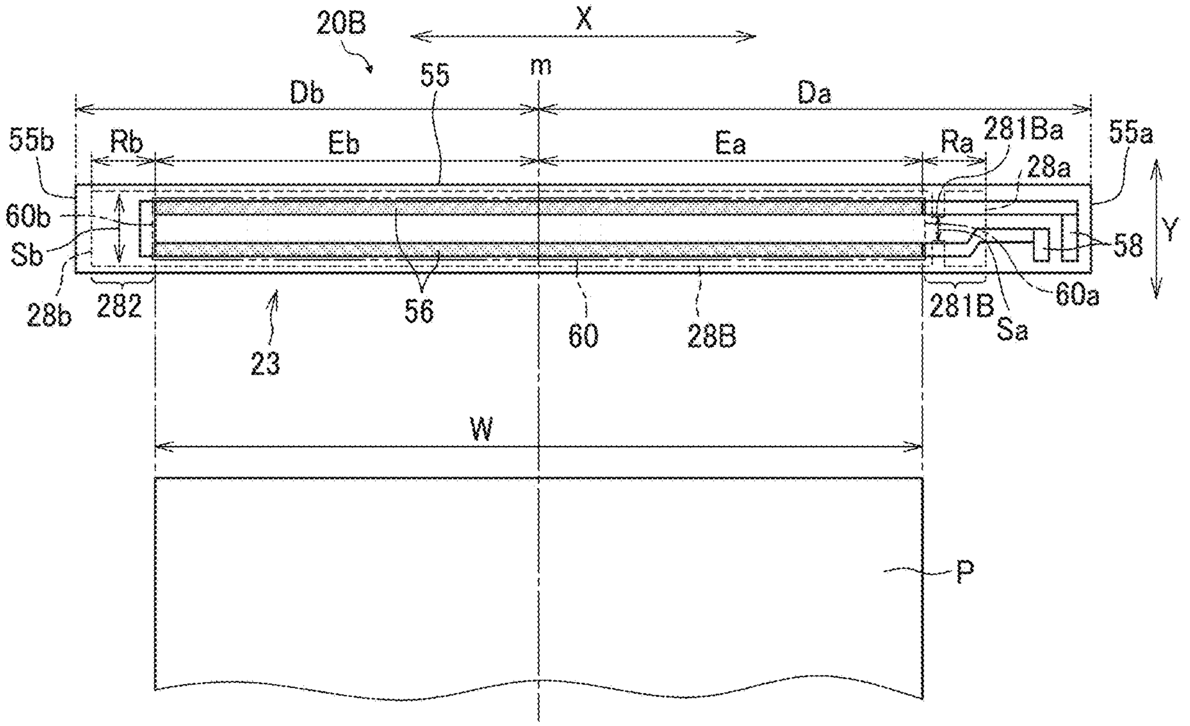
FIG. 10 is a plan view of a fixing device as a modification example of the fixing device depicted in FIG. 9, illustrating an electrode side projection incorporated in the fixing device.

For example, FIG. 10 illustrates a fixing device 20B that includes a thermal equalization plate 28B including an electrode side projection 281B. The electrode side projection 281B includes a part, that is, a retracted portion 281Ba (e.g., a narrow portion), that has a width Sa that is smaller than the width Sb of the non-electrode side projection 282. For example, an area of the electrode side projection 281B is smaller than an area of the non-electrode side projection 282. A volume (e.g., a thermal capacity) of an entirety of the electrode side projection 281B is smaller than a volume (e.g., a thermal capacity) of the non-electrode side projection 282. Hence, even if the width Sa of the entirety of the electrode side projection 281B is not smaller than the width Sb of the non-electrode side projection 282, the width Sa of a part of the electrode side projection 281B may be smaller than the width Sb of the non-electrode side projection 282.

Figure 11:
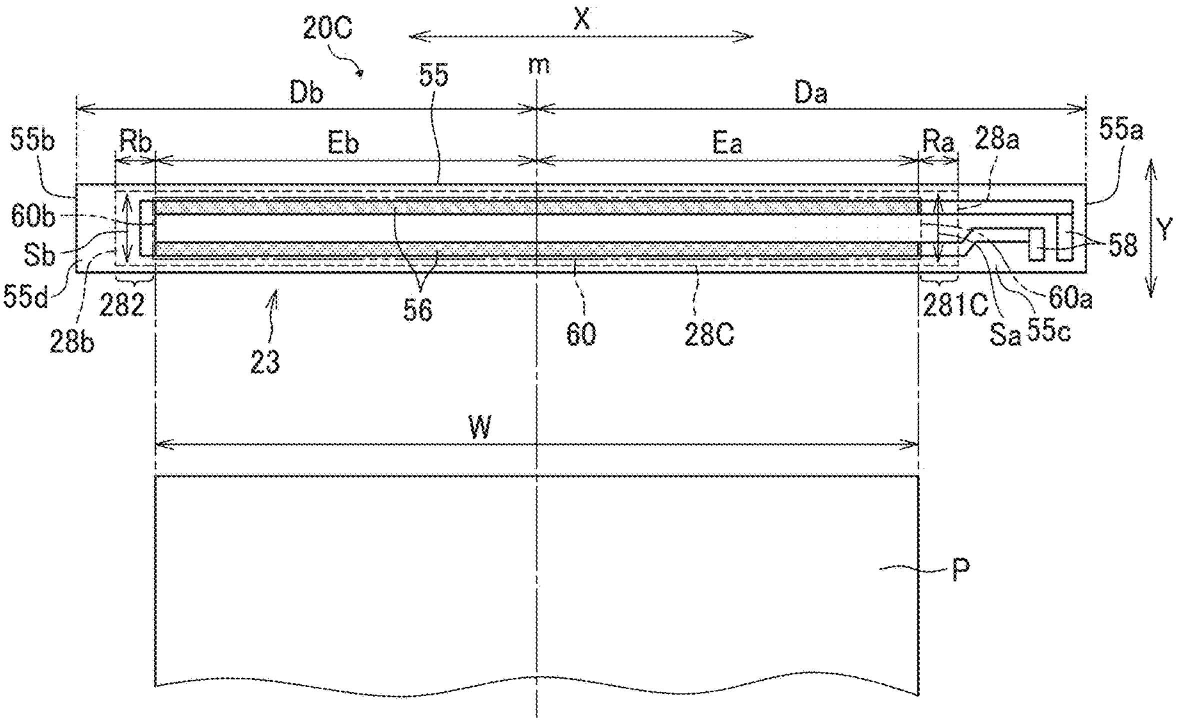
FIG. 11 is a plan view of a fixing device according to a third embodiment of the present disclosure, that is installable in the image forming apparatus depicted in FIG. 1.
Figure 12:
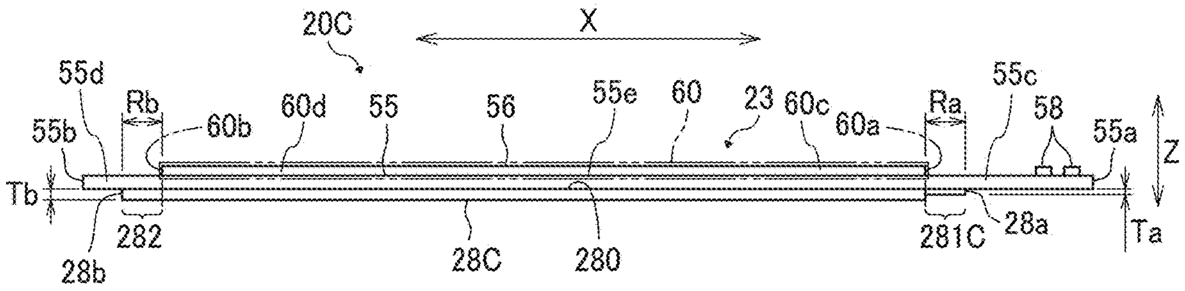
FIG. 12 is a side view of the fixing device according to the third embodiment of the present disclosure depicted in FIG. 11.

FIGS. 11 and 12 illustrate a construction of a fixing device 20C according to a third embodiment of the present disclosure.

As illustrated in FIGS. 11 and 12, the fixing device 20C according to the third embodiment includes a thermal equalization plate 28C including an electrode side projection 281C. The length Ra and the width Sa of the electrode side projection 281C are equal to the length Rb and the width Sb of the non-electrode side projection 282, respectively, (Ra=Rb, Sa=Sb). Conversely, the thickness Ta of the electrode side projection 281C is different from the thickness Tb of the non-electrode side projection 282. For example, according to the third embodiment, the thickness Ta of the electrode side projection 281C is smaller than the thickness Tb of the non-electrode side projection 282 (Ta<Tb) in a direction perpendicular to a mounting face 55*e* of the base 55, that mounts the resistive heat generators 56. Hence, a volume (e.g., a thermal capacity) of the electrode side projection 281C is smaller than a volume (e.g., a thermal capacity) of the non-electrode side projection 282.

Accordingly, with the construction of the fixing device 20C according to the third embodiment also, an amount of heat conducted from the heat generation portion 60 to the mounting portion 55*c* through the thermal equalization plate 28C is smaller than an amount of heat conducted from the heat generation portion 60 to the non-mounting portion 55*d* through the thermal equalization plate 28C. Thus, the thermal equalization plate 28C balances an amount of heat between the electrode side portion 60*c* and the non-electrode side portion 60*d* of the heat generation portion 60. Accordingly, like the fixing device 20 according to the first embodiment described above, the fixing device 20C suppresses uneven temperature. The thermal equalization plate 28C suppresses temperature decrease in the electrode side portion 60*c* of the heat generation portion 60 and overheating in the non-electrode side portion 60*d* of the heat generation portion 60. The fixing device 20C according to the third embodiment also does not have the configuration in which the first heat generation amount per unit area of one lateral end portion of the heat generation portion 60 of the heater 23 in the longitudinal direction X thereof is different from the second heat generation amount per unit area of another lateral end portion of the heat generation portion 60 of the heater 23 in the longitudinal direction X thereof. Accordingly, the fixing device 20C is immune from adverse effects caused by the first heat generation amount per unit area and the second heat generation amount per unit area that is different from the first heat generation amount per unit area. For example, the adverse effects include uneven temperature caused by the resistive heat generators 56 that generate heat in the maximum heat generation amount and breakage of parts caused by local thermal expansion of the parts.

The fixing devices 20, 20A, 20B, and 20C according to the embodiments decrease the volume (e.g., the thermal capacity) of an electrode side projection (e.g., the electrode side projections 281, 281A, 281B, and 281C) with adjustment of one of the length Ra, the width Sa, and the thickness Ta of the electrode side projection. Alternatively, two or three of the length Ra, the width Sa, and the thickness Ta of the electrode side projection may be adjusted. For example, two or three of the length Ra, the width Sa, and the thickness Ta of the electrode side projection may be smaller than two or three of the length Rb, the width Sb, and the thickness Tb of the non-electrode side projection 282, respectively. Accordingly, the fixing devices 20, 20A, 20B, and 20C select a temperature balance adjuster that balances an amount of heat between the electrode side portion 60*c* and the non-electrode side portion 60*d* of the heat generation portion 60 from a wide range of options, thus suppressing uneven temperature more effectively.

Figure 13:
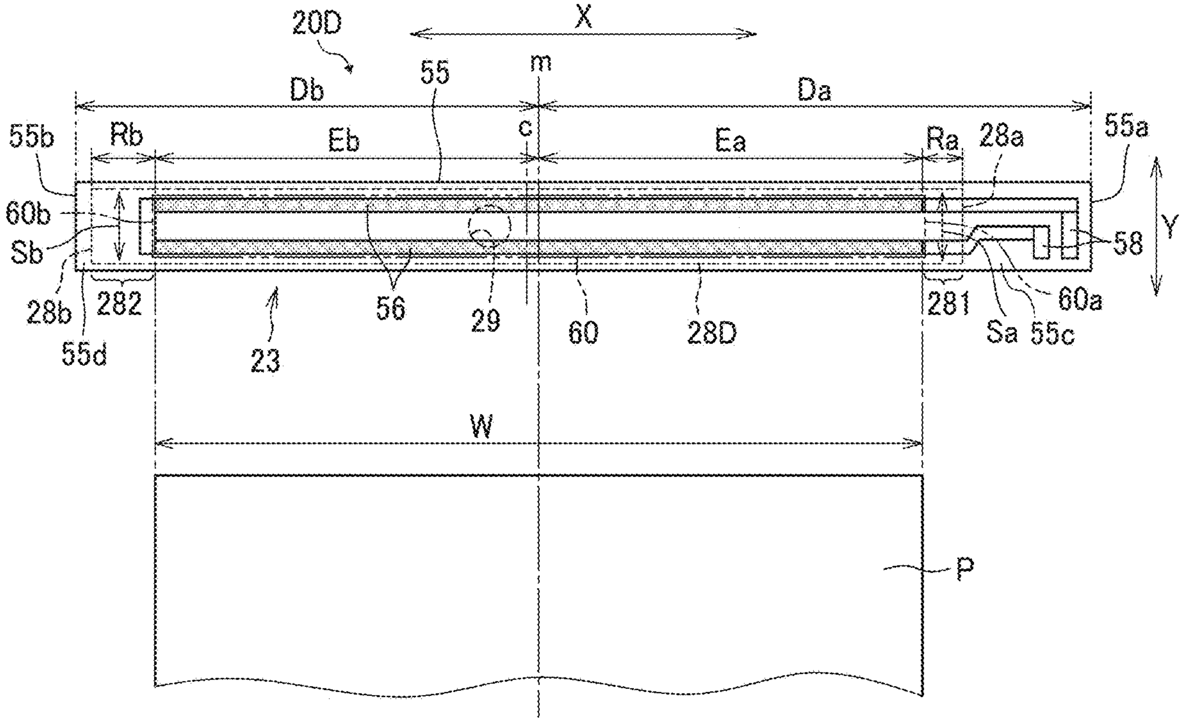
FIG. 13 is a plan view of a fixing device according to a fourth embodiment of the present disclosure, that is installable in the image forming apparatus depicted in FIG. 1, illustrating a hole incorporated in the fixing device.

FIG. 13 illustrates a construction of a fixing device 20D according to a fourth embodiment of the present disclosure.

As illustrated in FIG. 13, the fixing device 20D according to the fourth embodiment includes a thermal equalization plate 28D including a hole 29. The hole 29 is shifted from a center c of the thermal equalization plate 28D in the longitudinal direction X of the base 55 toward one lateral end of the thermal equalization plate 28D. According to the fourth embodiment, the hole 29 is shifted from the center c of the thermal equalization plate 28D in the longitudinal direction X of the base 55 toward the non-electrode side projection 282. Hence, according to the fourth embodiment, the thermal equalization plate 28D has a shape that is asymmetrical with respect to the center c of the thermal equalization plate 28D.

As described above, according to the fourth embodiment, since the thermal equalization plate 28D is asymmetrical with respect to the center c of the thermal equalization plate 28D, a manufacturing engineer readily identifies one lateral end of the thermal equalization plate 28D in the longitudinal direction X of the base 55, that is to be placed on the non-mounting portion 55*d* that does not mount the electrodes 58. For example, as illustrated in FIG. 13, the manufacturing engineer identifies the non-electrode side end 28*b* (e.g., a left lateral end of the thermal equalization plate 28D in FIG. 13) that is closer to the hole 29 than the electrode side end 28*a* is and is to be placed on the non-mounting portion 55*d* that does not mount the electrodes 58. Hence, the fixing device 20D according to the fourth embodiment prevents the manufacturing engineer from erroneously installing the thermal equalization plate 28D such that the electrode side end 28*a* is attached to the non-mounting portion 55*d* and the non-electrode side end 28*b* is attached to the mounting portion 55*c*. Additionally, the fixing device 20D facilitates assembly of the heater 23 and the thermal equalization plate 28D.

The construction of the fixing device 20D is preferably applied to the thermal equalization plate 28D depicted in FIG. 13 that has the length Ra of the electrode side projection 281 that is different from the length Rb of the non-electrode side projection 282 (e.g., Ra<Rb). The thermal equalization plate 28D has the width Sa of the electrode side projection 281 that is equal to the width Sb of the non-electrode side projection 282 (Sa=Sb). The thermal equalization plate 28D has the thickness Ta of the electrode side projection 281 that is equal to the thickness Tb of the non-electrode side projection 282 (Ta=Tb). In this case, before the thermal equalization plate 28D is attached to the heater 23, the manufacturing engineer may not identify, at a glance, one lateral end of the thermal equalization plate 28D in the longitudinal direction X of the base 55, that is to be placed on the non-mounting portion 55*d* that does not mount the electrodes 58. The thermal equalization plate 28D preferably has the hole 29 as described above that shapes the thermal equalization plate 28D asymmetrically with respect to the center c of the thermal equalization plate 28D. Thus, the thermal equalization plate 28D suppresses erroneous assembly and improves assembly by the manufacturing engineer.

Figure 14:
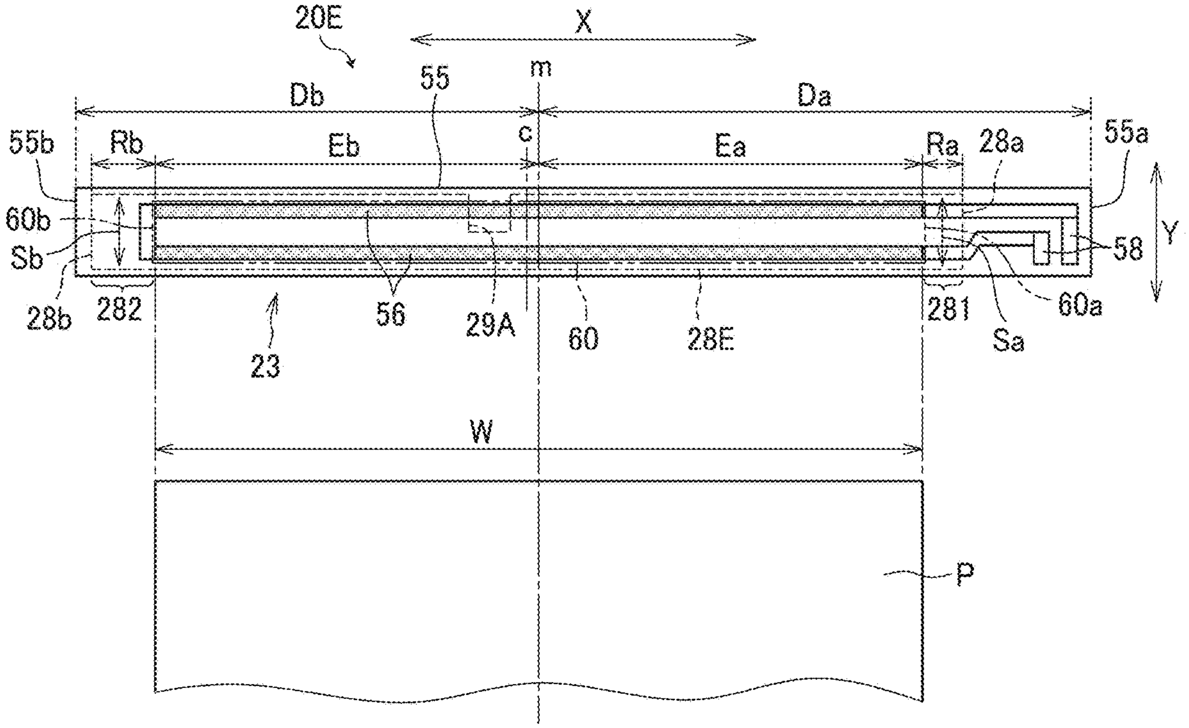
FIG. 14 is a plan view of a fixing device as a modification example of the fixing device depicted in FIG. 13, illustrating a recess incorporated in the fixing device.

As illustrated in FIG. 13, the hole 29 is circular. Alternatively, the hole 29 may be rectangular or may have other shapes. FIG. 14 illustrates other shape of the hole 29. As illustrated in FIG. 14, a fixing device 20E includes a thermal equalization plate 28E including a recess 29A. For example, a part of a long side of the thermal equalization plate 28E is recessed or cut out in the short direction Y of the base 55 to create the recess 29A.

Figure 15:
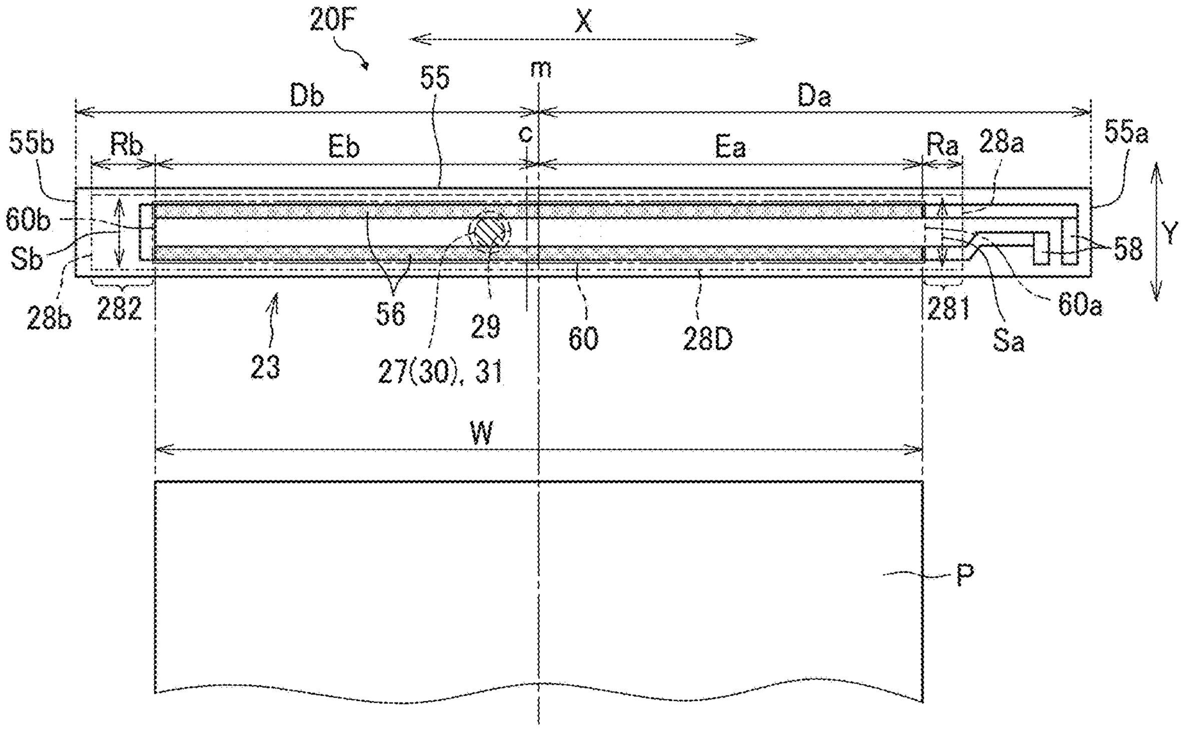
FIG. 15 is a plan view of a fixing device according to a fifth embodiment of the present disclosure, that is installable in the image forming apparatus depicted in FIG. 1.

Subsequently, FIG. 15 illustrates a construction of a fixing device 20F according to a fifth embodiment of the present disclosure.

Like the fixing device 20D according to the fourth embodiment depicted in FIG. 13, the fixing device 20F according to the fifth embodiment depicted in FIG. 15 includes the hole 29 penetrating through the thermal equalization plate 28D. Inside the hole 29 is the temperature sensor 27 that detects the temperature of the heater 23. The temperature sensor 27 includes a thermistor 30.

As described above, since the temperature sensor 27 is disposed inside the hole 29, the thermistor 30 is situated in proximity to the heater 23. Accordingly, the thermistor 30 improves detection accuracy and responsiveness.

Figure 16:
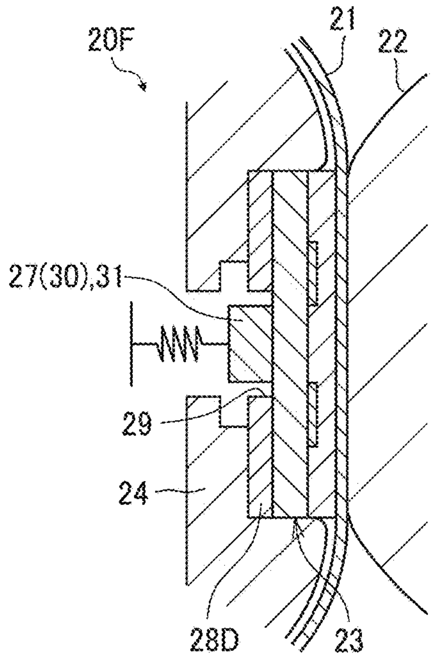
FIG. 16 is an enlarged cross-sectional view of the fixing device depicted in FIG. 15, illustrating a through hole incorporated in the fixing device.

For example, FIG. 16 illustrates the hole 29 (e.g., a through hole) that penetrates from a heater opposed face of the thermal equalization plate 28D, that is disposed opposite the heater 23, to a heater holder opposed face of the thermal equalization plate 28D, that is disposed opposite the heater holder 24. The thermistor 30 contacts the heater 23 directly through the hole 29. Heat generated by the heater 23 is conducted to the thermistor 30 directly. Accordingly, the thermistor 30 improves detection accuracy and responsiveness effectively.

Figure 17:
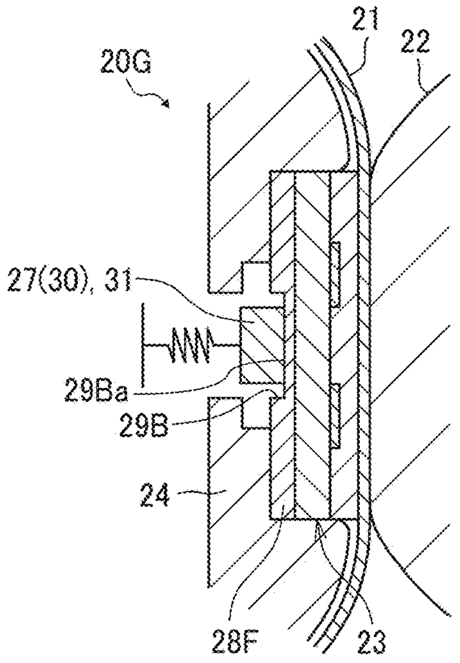
FIG. 17 is an enlarged cross-sectional view of a fixing device as a modification example of the fixing device depicted in FIG. 16, illustrating a hole having a bottom, that is incorporated in the fixing device.

FIG. 17 illustrates a fixing device 20G including a thermal equalization plate 28F provided with a hole 29B that has a bottom 29Ba and does not penetrate through the thermal equalization plate 28F. The thermistor 30 is disposed opposite the heater 23 indirectly via the bottom 29Ba of the hole 29B. However, the thermistor 30 is situated in proximity to the heater 23 via the hole 29B. Accordingly, the thermistor 30 improves detection accuracy and responsiveness.

A temperature sensor serving as a temperature detector disposed inside the hole 29 or 29B is not limited to the temperature sensor 27 (e.g., the thermistor 30) that is used to control the heater 23 to retain a predetermined temperature of the fixing belt 21. Alternatively, the temperature detector may be a thermostat 31 serving as a safety device that interrupts heat generation of the heater 23 when the heater 23 has a temperature higher than the predetermined temperature. In this case also, as the thermostat 31 is situated inside the hole 29 or 29B, the thermostat 31 improves detection accuracy and responsiveness.

Figure 18:
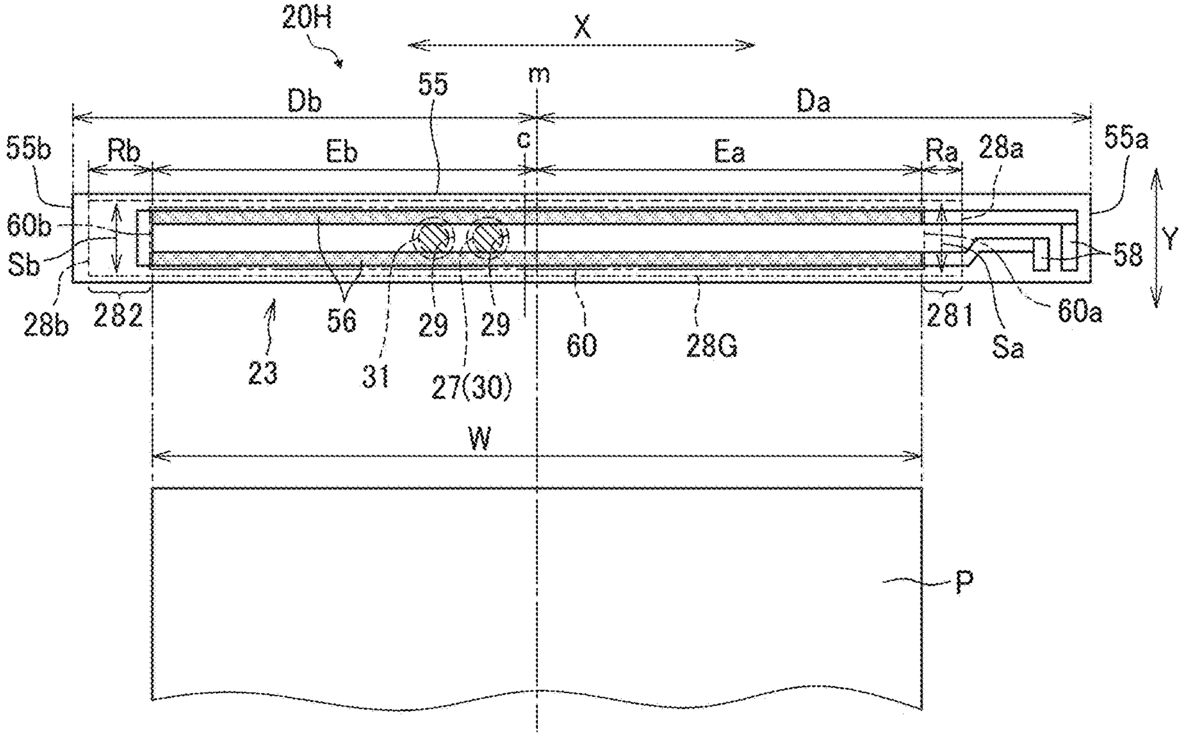
FIG. 18 is a plan view of a fixing device as another modification example of the fixing device depicted in FIG. 16, illustrating two holes that are incorporated in the fixing device and placed with a thermistor and a thermostat, respectively.

FIG. 18 illustrates a fixing device 20H including a thermal equalization plate 28G. The thermal equalization plate 28G includes two holes 29 that are shifted from the center c of the thermal equalization plate 28G in the longitudinal direction X of the base 55. The thermistor 30 is disposed inside one of the holes 29. The thermostat 31 is disposed inside another one of the holes 29. The holes 29 where the thermistor 30 and the thermostat 31 are situated, respectively, have a shape that is not limited to a circle. Each of the holes 29 may have a shape that is rectangular or other shape. For example, a part of a long side of the thermal equalization plate 28G may be cut out as illustrated in FIG. 14. Alternatively, the number of the holes 29 may be three or more.

As described above, according to the embodiments of the present disclosure, even with a configuration in which the electrodes 58 are disposed on one lateral end portion (e.g., the mounting portion 55*c*) of the base 55 in the longitudinal direction X thereof and the base 55 is elongated outboard from the heat generation portion 60 in one lateral end portion of the base 55 in the longitudinal direction X thereof, a thermal equalization plate (e.g., the thermal equalization plates 28, 28A, 28B, 28C, 28D, 28E, 28F, and 28G) adjusts the thermal capacity at one lateral end portion (e.g., the electrode side projections 281, 281A, 281B, and 281C) and another lateral end portion (e.g., the non-electrode side projection 282) of the thermal equalization plate in the longitudinal direction X of the base 55. Thus, the thermal equalization plate balances an amount of heat inside a fixing device (e.g., the fixing devices 20, 20A, 20B, 20C, 20D, 20E, 20F, 20G, and 20H). Application of the technology of the present disclosure is not limited to a configuration in which the electrodes 58 are disposed on one lateral end portion of the base 55 in the longitudinal direction X thereof. The technology of the present disclosure is also applied to a configuration in which the electrodes 58 are disposed on one lateral end portion and another lateral end portion of the base 55 in the longitudinal direction X thereof as illustrated in FIG. 19.

Figure 19:
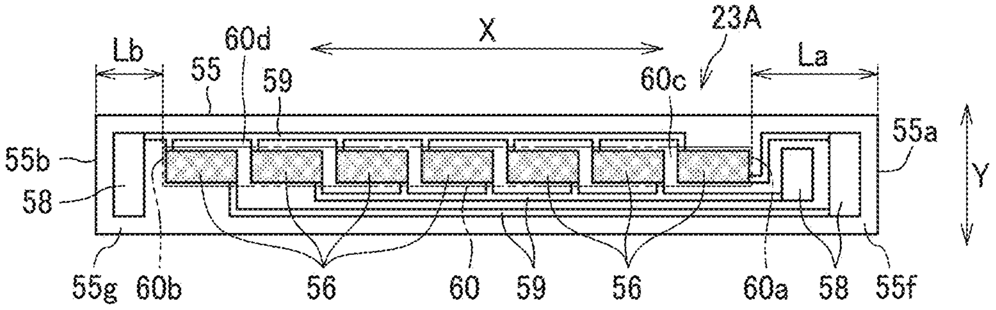
FIG. 19 is a plan view of a heater as a variation of the heater depicted in FIG. 6, that incorporates a base and electrodes mounted on both lateral end portions of the base.

FIG. 19 illustrates a heater 23A including the electrodes 58 that are mounted on one lateral end portion **55*f* and another lateral end portion 55*g* of the base 55 in the longitudinal direction X thereof. For example, the electrodes 58 are interposed between the electrode side end 55*a*, that is, one lateral end, of the base 55 and the electrode side end 60*a*, that is, one lateral end, of the heat generation portion 60 in the longitudinal direction X of the base 55. The electrode 58 is interposed between the non-electrode side end 55*b*, that is, another lateral end, of the base 55 and the non-electrode side end 60*b*, that is, another lateral end, of the heat generation portion 60 in the longitudinal direction X of the base 55. The number of the electrodes 58 disposed on the one lateral end portion 55*f* of the base 55 in the longitudinal direction X thereof is different from the number of the electrode 58 disposed on the another lateral end portion 55*g* of the base 55 in the longitudinal direction X thereof. For example, two electrodes 58 are mounted on the one lateral end portion 55*f* (e.g., a right end portion in FIG. 19) of the base 55 in the longitudinal direction X thereof. Conversely, a single electrode 58 is mounted on the another lateral end portion 55*g* (e.g., a left end portion in FIG. 19) of the base 55** in the longitudinal direction X thereof.

As described above, with the heater 23A depicted in FIG. 19, the number of the electrodes 58 disposed on the one lateral end portion **55*f* of the base 55 in the longitudinal direction X thereof is different from the number of the electrode 58 disposed on the another lateral end portion 55*g* of the base 55 in the longitudinal direction X thereof. Hence, the base 55 secures greater space at the one lateral end portion 55*f* where the electrodes 58 in a greater number are situated compared to space at the another lateral end portion 55*g*. Accordingly, with the heater 23A depicted in FIG. 19, the length La of the one lateral end portion 55*f* interposed between the electrode side end 55*a*, that is, one lateral end, of the base 55 and the electrode side end 60*a*, that is, one lateral end, of the heat generation portion 60 in the longitudinal direction X of the base 55 is greater than the length Lb of the another lateral end portion 55*g* interposed between the non-electrode side end 55*b*, that is, another lateral end, of the base 55 and the non-electrode side end 60*b*, that is, another lateral end, of the heat generation portion 60 in the longitudinal direction X of the base 55**.

Accordingly, also with the heater 23A depicted in FIG. 19, like the heater 23 according to the embodiments described above, when the resistive heat generators 56 of the heater 23A generate heat, the heat is conducted to the one lateral end portion **55*f* of the base 55 in an amount greater than an amount of heat conducted to the another lateral end portion 55*g* having the length Lb smaller than the length La of the one lateral end portion 55*f*. Hence, the heater 23A preferably employs a thermal equalization plate (e.g., the thermal equalization plate 28, 28A, 28B, 28C, 28D, 28E, 28F, or 28G) according to the embodiments of the present disclosure. The thermal equalization plate balances an amount of heat between the electrode side portion 60*c* and the non-electrode side portion 60*d* of the heat generation portion 60, suppressing uneven temperature of the heater 23A and the fixing belt 21**.

The embodiments of the present disclosure are also applied to fixing devices 20I, 20J, 20K and 20L illustrated in FIGS. 20 to 23, respectively.

The following describes a construction of each of the fixing devices 20I, 20J, 20K and 20L illustrated in FIGS. 20 to 23, respectively.

Figure 20:
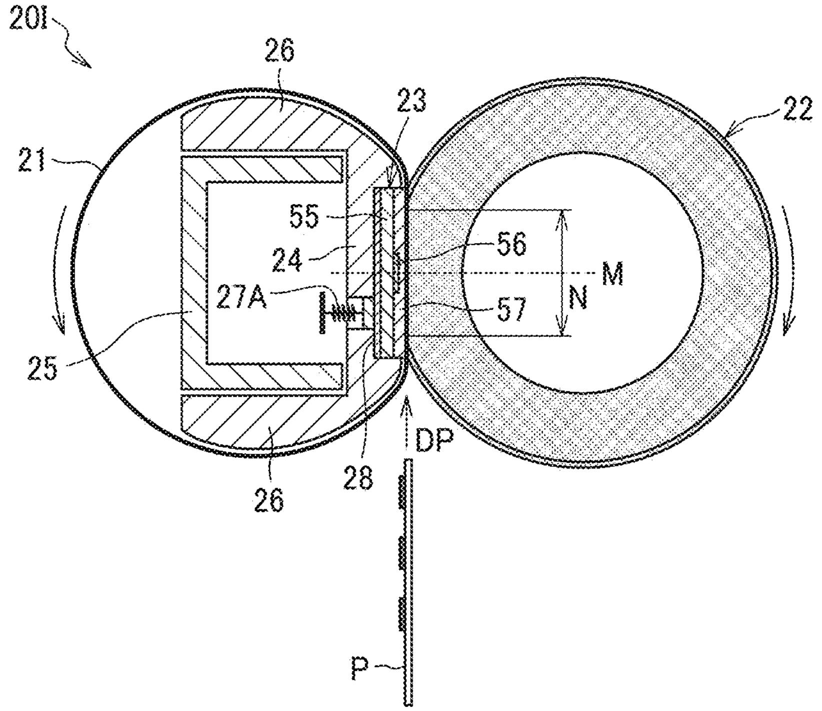
FIG. 20 is a schematic cross-sectional view of a fixing device according to another embodiment of the present disclosure that is installable in the image forming apparatus depicted in FIG. 1.

FIG. 20 illustrates a construction of the fixing device 20I including a temperature sensor 27A that detects the temperature of the heater 23. The temperature sensor 27A is disposed at a position different from a position of the temperature sensor 27 of the fixing device 20 depicted in FIG. 2. Other construction of the fixing device 20I is equivalent to the construction of the fixing device 20. In the fixing device 20I depicted in FIG. 20, the temperature sensor 27A is disposed upstream from a center M of the fixing nip N in the sheet conveyance direction DP and disposed in proximity to an entry to the fixing nip N. Conversely, in the fixing device 20 depicted in FIG. 2, the temperature sensor 27 is disposed opposite the center M of the fixing nip N in the sheet conveyance direction DP. As illustrated in FIG. 20, since the temperature sensor 27A is disposed upstream from the center M of the fixing nip N in the sheet conveyance direction DP, the temperature sensor 27A detects the temperature of the heater 23 precisely at a position in proximity to the entry to the fixing nip N. In a region on the fixing belt 21, that is disposed in proximity to the entry to the fixing nip N, a sheet P entering the fixing nip N draws heat from the fixing belt 21 easily. Hence, the temperature sensor 27A detects the temperature of the heater 23 precisely at the position in proximity to the entry to the fixing nip N, thus achieving a fixing property of causing the heater 23 to heat the fixing belt 21 to fix a toner image on the sheet P and effectively suppressing a fixing offset of heating the toner image insufficiently.

Figure 21:
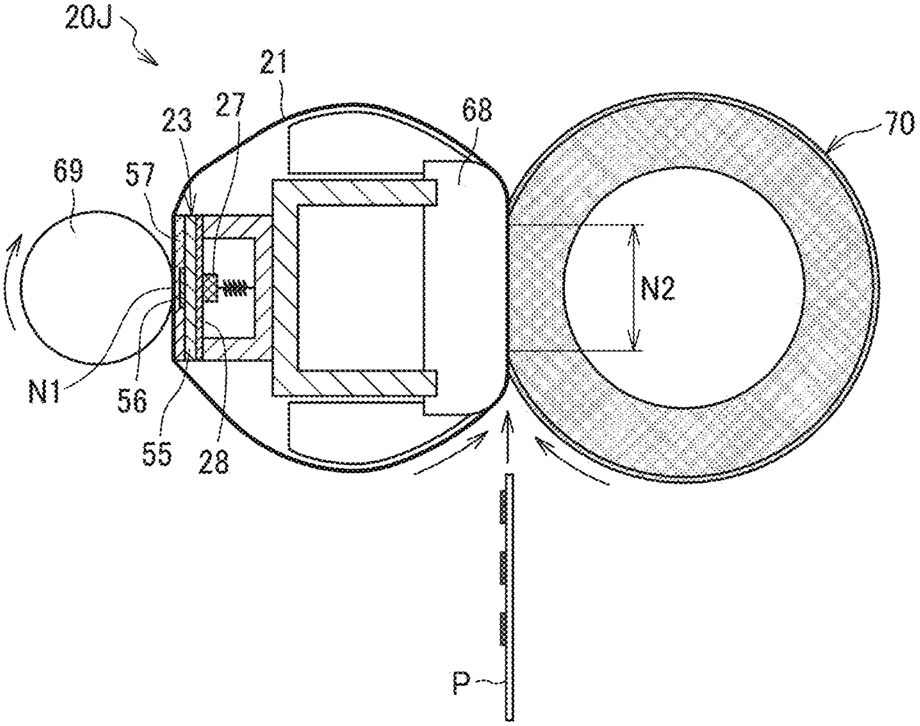
FIG. 21 is a schematic cross-sectional view of a fixing device according to yet another embodiment of the present disclosure that is installable in the image forming apparatus depicted in FIG. 1.

FIG. 21 illustrates a construction of the fixing device 20J having a heating nip N1 and a fixing nip N2 disposed separately from the heating nip N1. The heater 23 heats the fixing belt 21 that passes through the heating nip N1. A sheet P is conveyed through the fixing nip N2. For example, the fixing device 20J includes a nip formation pad 68 that is disposed within the loop formed by the fixing belt 21 in addition to the heater 23. The fixing device 20J further includes pressure rollers 69 and 70. The pressure rollers 69 and 70 disposed outside the loop formed by the fixing belt 21 are pressed against the heater 23 and the nip formation pad 68, respectively, via the fixing belt 21. Thus, the heater 23 and the pressure roller 69 form the heating nip N1 between the fixing belt 21 and the pressure roller 69. The nip formation pad 68 and the pressure roller 70 form the fixing nip N2 between the fixing belt 21 serving as a first rotator and the pressure roller 70 serving as a second rotator. The heater 23 heats the fixing belt 21 at the heating nip N1. The fixing belt 21 conducts heat to the sheet P at the fixing nip N2, thus fixing an unfixed toner image on the sheet P.

Figure 22:
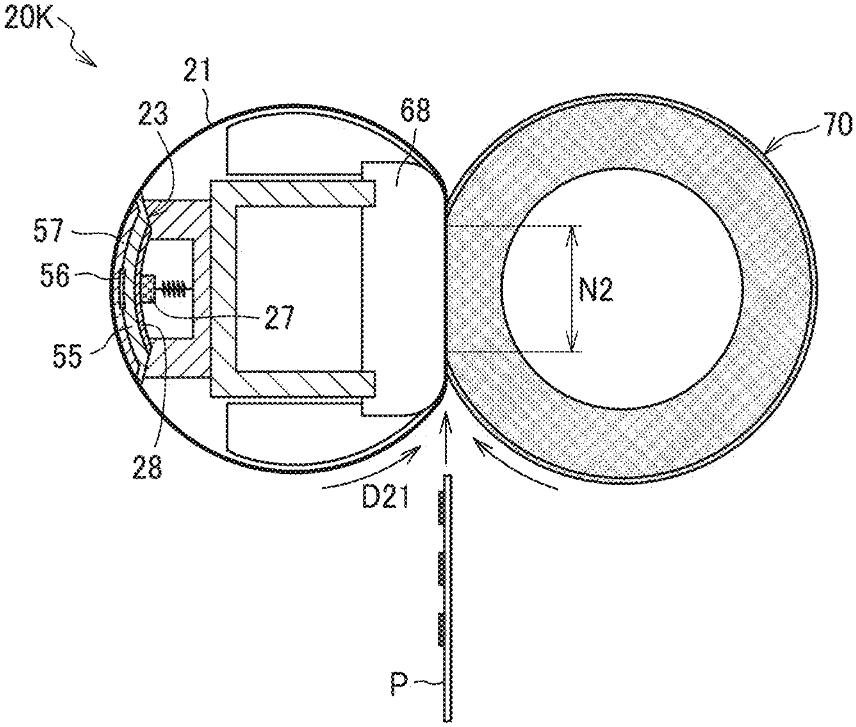
FIG. 22 is a schematic cross-sectional view of a fixing device according to yet another embodiment of the present disclosure that is installable in the image forming apparatus depicted in FIG. 1.

FIG. 22 illustrates a construction of the fixing device 20K that does not incorporate the pressure roller 69 that is disposed opposite the heater 23 as illustrated in FIG. 21. The heater 23 is curved into an arc in cross section that corresponds to a curvature of the fixing belt 21. Other construction of the fixing device 20K is equivalent to the construction of the fixing device 20J depicted in FIG. 21. Since the heater 23 is curved into the arc in cross section, the heater 23 contacts the fixing belt 21 for a sufficient contact length in the rotation direction D21 of the fixing belt 21, heating the fixing belt 21 efficiently.

Figure 23:
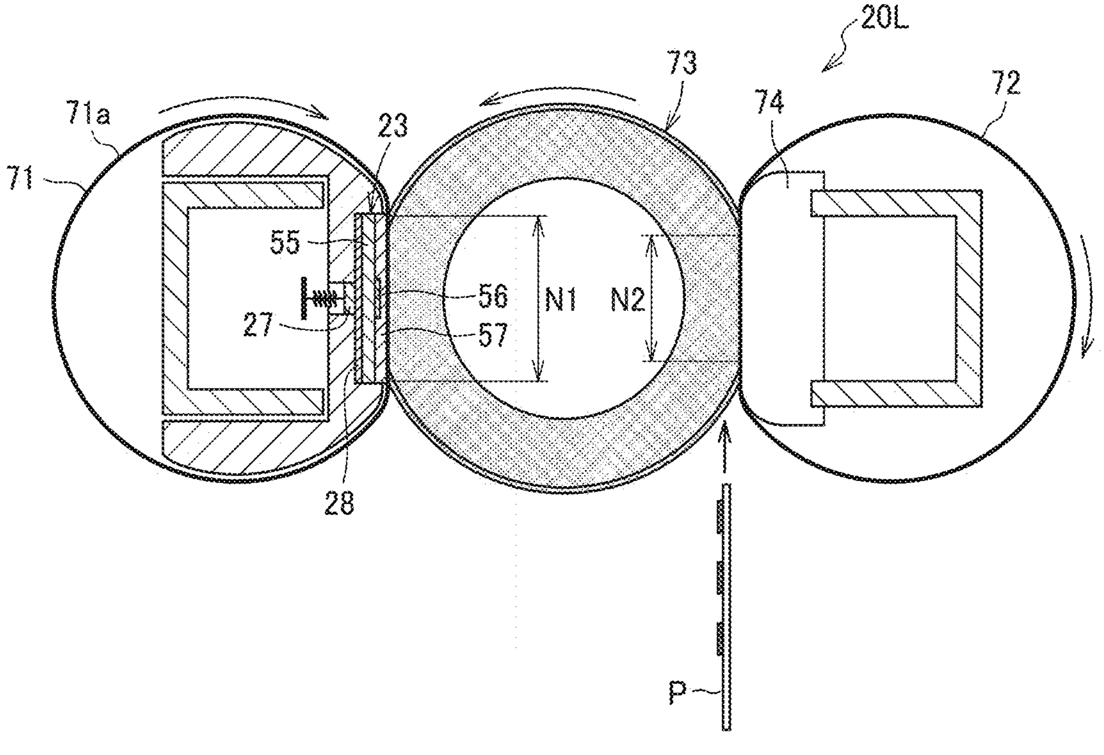
FIG. 23 is a schematic cross-sectional view of a fixing device according to yet another embodiment of the present disclosure that is installable in the image forming apparatus depicted in FIG. 1.

FIG. 23 illustrates a construction of the fixing device 20L that includes a pair of belts 71 and 72 and a roller 73 that is interposed between the belts 71 and 72. The heater 23 is disposed within a loop formed by the belt 71 on the left of the roller 73 in FIG. 23. The fixing device 20L further includes a nip formation pad 74 that is disposed within a loop formed by the belt 72 on the right of the roller 73 in FIG. 23. The heater 23 presses against the roller 73 via the belt 71 on the left of the roller 73 in FIG. 23, thus forming the heating nip N1 between the belt 71 and the roller 73. The roller 73 serving as a second rotator contacts an outer circumferential face 71*a* of the belt 71 serving as a first rotator, forming the heating nip N1 therebetween. The nip formation pad 74 presses against the roller 73 via the belt 72 on the right of the roller 73 in FIG. 23, thus forming the fixing nip N2 between the belt 72 and the roller 73.

An image forming apparatus applied with the embodiments of the present disclosure is not limited to the image forming apparatus 100 depicted in FIG. 1 that forms a color toner image. For example, the embodiments of the present disclosure are also applied to an image forming apparatus 100A having a construction described below with reference to FIG. 24. The following describes the construction of the image forming apparatus 100A to which the embodiments of the present disclosure are applied.

Figure 24:
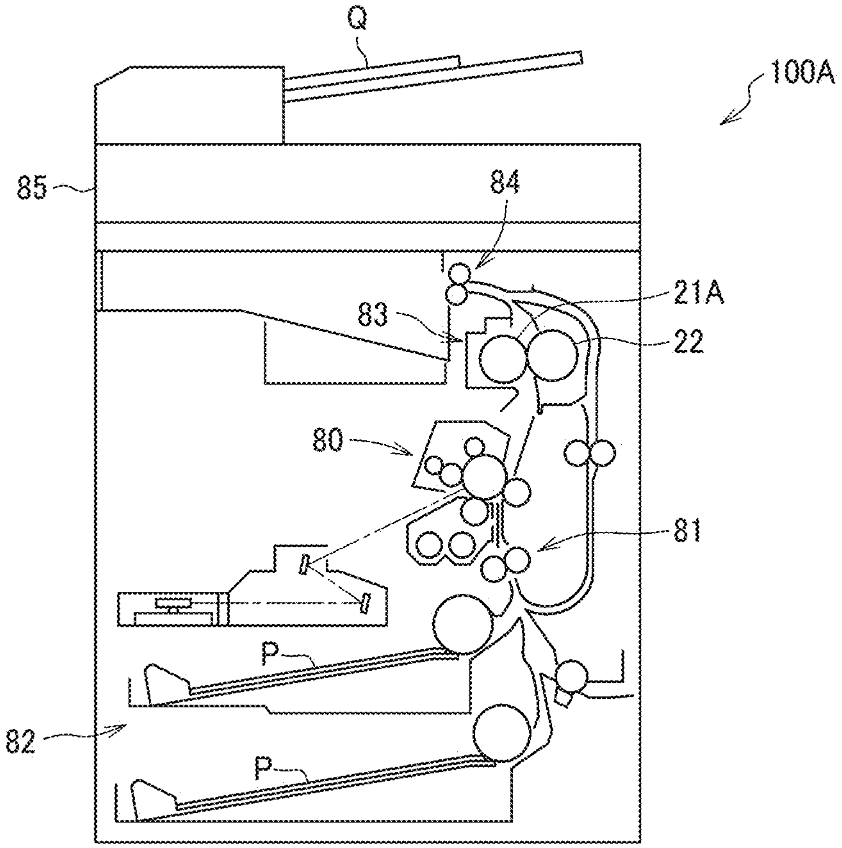
FIG. 24 is a schematic cross-sectional view of an image forming apparatus according to another embodiment of the present disclosure.

As illustrated in FIG. 24, the image forming apparatus 100A includes an image forming device 80 including a photoconductive drum, a sheet conveyance device including a timing roller pair 81, a sheet feeder 82, a fixing device 83, an output device 84, and a scanner 85. The sheet feeder 82 includes a plurality of sheet trays (e.g., paper trays) that loads a plurality of sheets P having different sizes, respectively.

The scanner 85 reads an image on an original Q into image data. The sheet feeder 82 loads the plurality of sheets P and feeds the sheets P to a conveyance path one by one. The timing roller pair 81 conveys the sheet P conveyed through the conveyance path to the image forming device 80.

The image forming device 80 forms a toner image on the sheet P. For example, the image forming device 80 includes the photoconductive drum, a charging roller, an exposure device, a developing device, a replenishing device, a transfer roller, a cleaner, and a discharger. The fixing device 83 includes a fixing belt 21A and the pressure roller 22 that fix the toner image on the sheet P under heat and pressure. The sheet P bearing the fixed toner image is conveyed to the output device 84 by a conveyance roller and the like. The output device 84 ejects the sheet P onto an outside of the image forming apparatus 100A.

Figure 25:
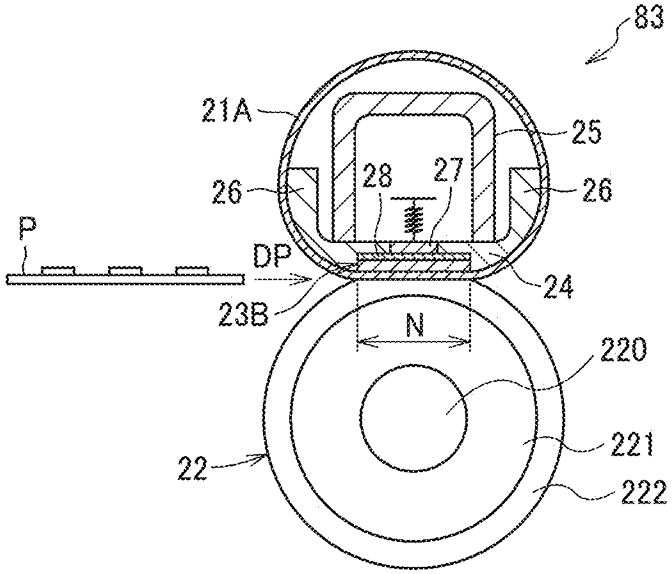
FIG. 25 is a schematic cross-sectional view of a fixing device incorporated in the image forming apparatus depicted in FIG. 24.

Referring to FIG. 25, a description is provided of a construction of the fixing device 83 according to an embodiment of the present disclosure.

The fixing device 83 depicted in FIG. 25 includes elements that are shared with the fixing device 20 depicted in FIG. 2 and assigned with reference numerals depicted in FIG. 2. A description of the shared elements is omitted.

As illustrated in FIG. 25, the fixing device 83 includes the fixing belt 21A, the pressure roller 22, a heater 23B, the thermal equalization plate 28, the heater holder 24, the stay 25, the guides 26, and the temperature sensors 27.

The fixing nip N is formed between the fixing belt 21A and the pressure roller 22. The fixing nip N has a nip length of 10 mm in the sheet conveyance direction DP. The fixing belt 21A and the pressure roller 22 convey the sheet P at a linear velocity of 240 mm/s.

The fixing belt 21A includes a base layer made of polyimide and a release layer and does not include an elastic layer. The release layer is heat-resistant film made of fluororesin, for example. The fixing belt 21A has an outer diameter of approximately 24 mm.

The pressure roller 22 includes the core metal 220, the elastic layer 221, and the release layer 222. The pressure roller 22 has an outer diameter in a range of from 24 mm to 30 mm. The elastic layer 221 of the pressure roller 22 has a thickness in a range of from 3 mm to 4 mm.

The heater 23B includes a base, a thermal insulation layer, a conductor layer including resistive heat generators, and an insulating layer. The heater 23B has a total thickness of 1 mm. The heater 23B has a length of 13 mm in the sheet conveyance direction DP.

Figure 26:
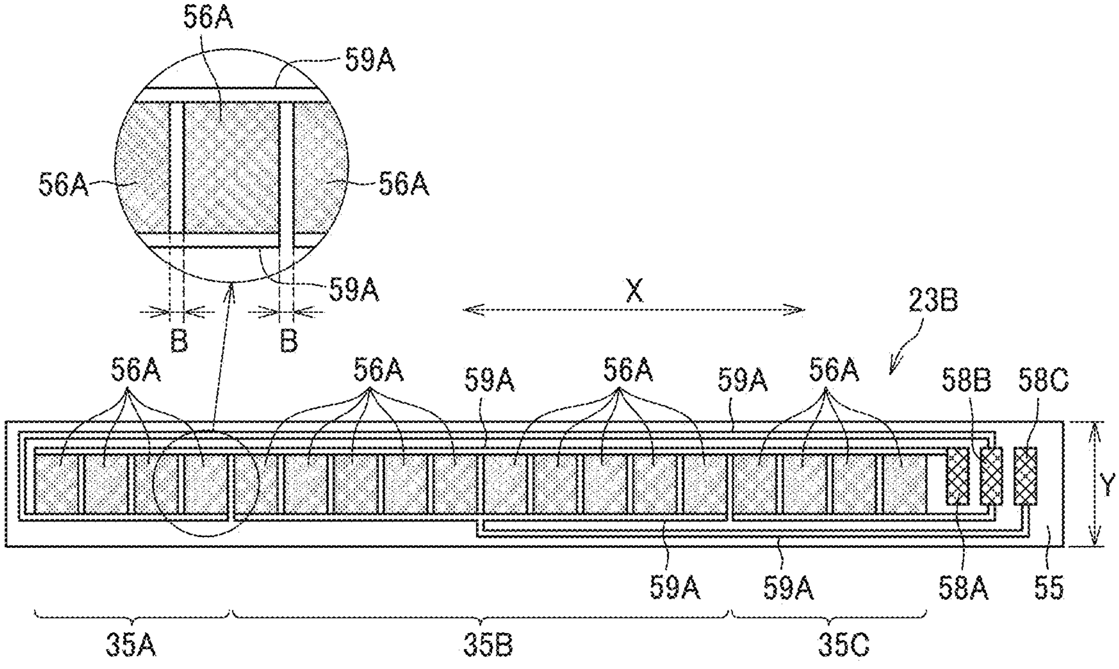
FIG. 26 is a plan view of a heater incorporated in the fixing device depicted in FIG. 25.

As illustrated in FIG. 26, the conductor layer of the heater 23B includes a plurality of resistive heat generators 56A, a plurality of feeders 59A, and a plurality of electrodes 58A, 58B, and 58C. The plurality of resistive heat generators 56A is arranged in the longitudinal direction X of the heater 23B with a gap B between the adjacent resistive heat generators 56A. The gap B between the adjacent resistive heat generators 56A defines a divided region. As illustrated in an enlarged view in FIG. 26, the resistive heat generators 56A create a plurality of gaps B each of which is provided between the adjacent resistive heat generators 56A. FIG. 26 illustrates two gaps B in the enlarged view. However, the gap B is disposed at each gap between the adjacent resistive heat generators 56A depicted in FIG. 26. In FIG. 26, the short direction Y is an orthogonal direction intersecting or being perpendicular to the longitudinal direction X of the heater 23B. The short direction Y is different from the thickness direction Z of the base 55. The short direction Y is an orthogonal direction perpendicular to an arrangement direction of the plurality of resistive heat generators 56A. The short direction Y is parallel to the mounting face of the base 55, which mounts the resistive heat generators 56A. The short direction Y is a short direction of the heater 23B. The short direction Y is parallel to the sheet conveyance direction DP in which the sheet P is conveyed through the fixing device 83.

The plurality of resistive heat generators 56A constructs a center heat generation portion 35B and lateral end heat generation portions 35A and 35C that generate heat separately from the center heat generation portion 35B. For example, the heater 23B includes the three electrodes 58A, 58B, and 58C. As power is supplied to the electrode 58A on the left of the electrode 58B and the electrode 58B disposed at a center of the three electrodes 58A, 58B, and 58C in FIG. 26, the lateral end heat generation portions 35A and 35C generate heat. As power is supplied to the electrodes 58A and 58C that sandwich the electrode 58B, the center heat generation portion 35B generates heat. For example, in order to fix a toner image on a sheet P having a decreased size, the center heat generation portion 35B generates heat. In order to fix a toner image on a sheet P having an increased size, the lateral end heat generation portions 35A and 35C and the center heat generation portion 35B generate heat collectively, heating the fixing belt 21A according to a size of a sheet P.

Figure 27:
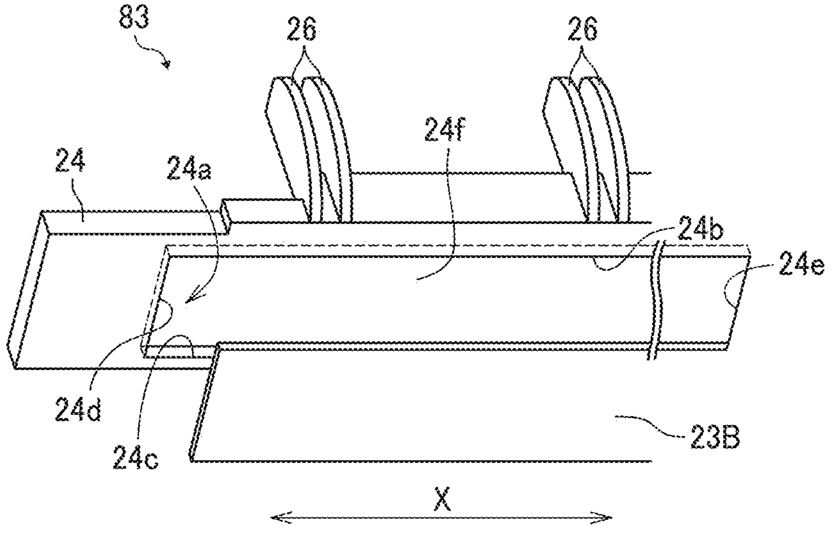
FIG. 27 is a perspective view of the heater and a heater holder incorporated in the fixing device depicted in FIG. 25.

As illustrated in FIG. 27, the heater holder 24 according to the embodiment includes a recess 24*a* that accommodates and holds the heater 23B and the thermal equalization plate 28 depicted in FIG. 25. The recess 24*a* is disposed on a heater opposed face of the heater holder 24, which is disposed opposite the heater 23B. The recess 24*a* is constructed of a bottom 24*f* (e.g., a bottom face) and four walls 24*b*, 24*c*, 24*d*, and 24*e* (e.g., side faces). The bottom 24*f* is a rectangle that is equivalent to the heater 23B in size. The four walls 24*b*, 24*c*, 24*d*, and 24*e* extend along four sides, respectively, that define a contour of the bottom 24*f* and are perpendicular to the bottom 24*f* The pair of walls 24*d* and 24*e* (e.g., a left wall and a right wall in FIG. 27) extends in a direction perpendicular to the longitudinal direction X of the heater 23B, that is, the arrangement direction in which the resistive heat generators 56A are arranged. One of the walls 24*d* and 24*e* may be omitted so that the recess 24*a* is open at a position disposed opposite one lateral end of the heater 23B in the longitudinal direction X thereof.

Figure 28:
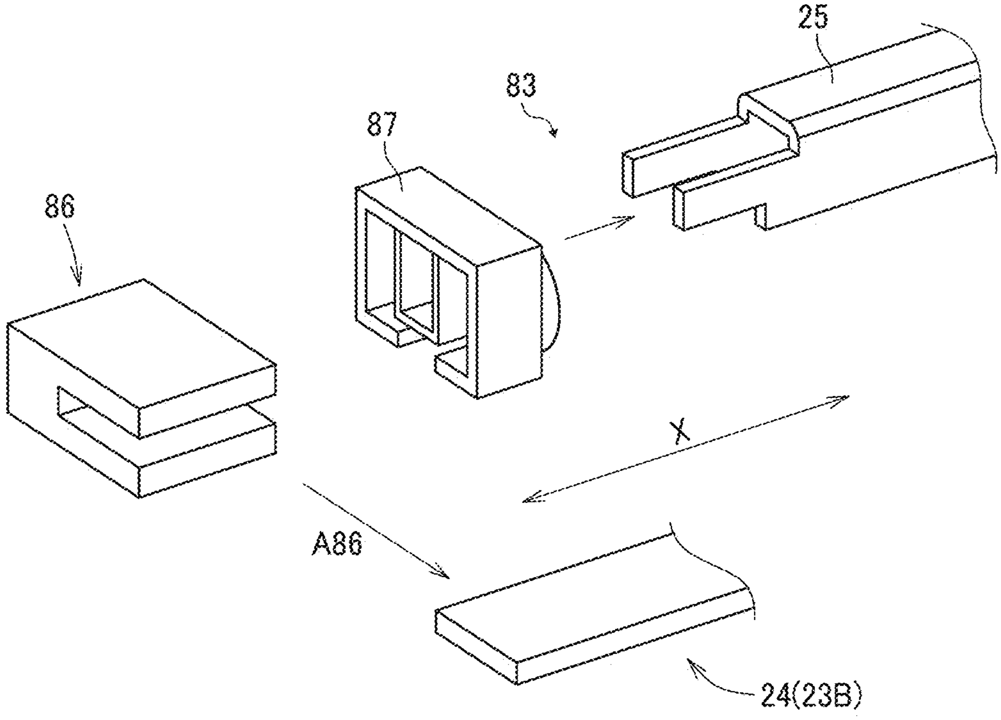
FIG. 28 is a perspective view of a connector to be attached to the heater depicted in FIG. 26, illustrating a method for attaching the connector to the heater.

As illustrated in FIG. 28, the fixing device 83 further includes a connector 86 that holds or supports the heater 23B and the heater holder 24 according to the embodiment. The connector 86 includes a housing made of resin such as LCP and a plurality of contact terminals disposed in the housing.

The connector 86 is attached to the heater 23B and the heater holder 24 in an attachment direction A86 perpendicular to the longitudinal direction X of the heater 23B, that is, the arrangement direction in which the resistive heat generators 56A are arranged. The connector 86 is attached to one lateral end of the heater 23B and the heater holder 24 in the longitudinal direction X of the heater 23B (e.g., the arrangement direction in which the resistive heat generators 56A are arranged). The one lateral end of the heater 23B and the heater holder 24 is opposite to another lateral end of the heater 23B and the heater holder 24 to which the driver (e.g., a motor) that drives the pressure roller 22 is coupled. Alternatively, in order to attach the connector 86 to the heater holder 24, one of the connector 86 and the heater holder 24 may include a projection that engages a recess disposed in another one of the connector 86 and the heater holder 24 such that the projection moves inside the recess relatively.

In a state in which the connector 86 is attached to the heater 23B and the heater holder 24, the connector 86 sandwiches and holds the heater 23B and the heater holder 24 such that the connector 86 is disposed opposite a front face and a back face of the heater 23B and the heater holder 24. In a state in which the connector 86 holds the heater 23B and the heater holder 24, as the contact terminals of the connector 86 contact and press against the electrodes 58A, 58B, and 58C of the heater 23B, the resistive heat generators 56A are electrically connected to a power supply disposed in the image forming apparatus 100A through the connector 86. Thus, the power supply is ready to supply power to the resistive heat generators 56A.

The fixing device 83 further includes a flange 87 depicted in FIG. 28. The flange 87 is disposed at each lateral end of the fixing belt 21A in the longitudinal direction X thereof. The flange 87 serves as a belt holder that contacts an inner circumferential face of the fixing belt 21A depicted in FIG. 25 and holds or supports the fixing belt 21A at each lateral end of the fixing belt 21A in the longitudinal direction X thereof. The flange 87 is inserted into each lateral end of the stay 25 in the longitudinal direction X thereof and is secured to each of a pair of side plates serving as a frame of the fixing device 83.

Figure 29:
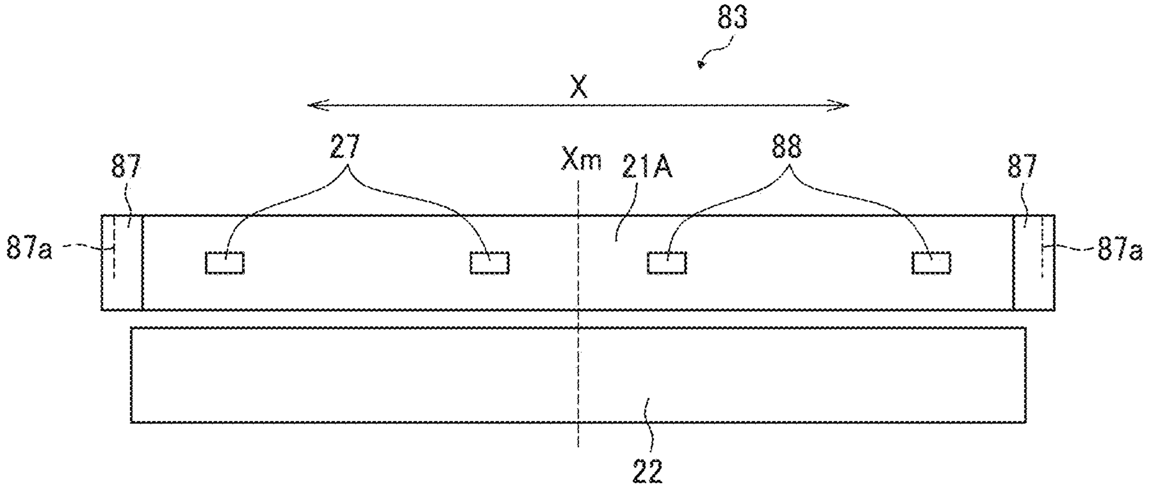
FIG. 29 is a diagram of the fixing device depicted in FIG. 25, illustrating an arrangement of a temperature sensor and a thermostat incorporated therein.

As illustrated in FIG. 29, the fixing device 83 according to the embodiment further includes a plurality of thermostats 88 serving as a breaker. FIG. 29 is a diagram of the fixing device 83, illustrating an arrangement of the temperature sensors 27 and the thermostats 88.

As illustrated in FIG. 29, the temperature sensors 27 according to the embodiment are disposed opposite the inner circumferential face of the fixing belt 21A at a position in proximity to a center Xm and a position in one lateral end portion of the fixing belt 21A in the longitudinal direction X thereof, respectively. One of the temperature sensors 27 is disposed opposite the gap B depicted in FIG. 26 between the adjacent resistive heat generators 56A of the heater 23B.

The thermostats 88 serving as the breaker are disposed opposite the inner circumferential face of the fixing belt 21A at a position in proximity to the center Xm and a position in another lateral end portion of the fixing belt 21A in the longitudinal direction X thereof, respectively. Each of the thermostats 88 detects a temperature of the inner circumferential face of the fixing belt 21A or an ambient temperature at a position in proximity to the inner circumferential face of the fixing belt 21A. If the temperature detected by the thermostat 88 is higher than a preset threshold, the thermostat 88 breaks power to the heater 23B.

Figure 30:
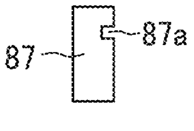
FIG. 30 is a diagram of a flange incorporated in the fixing device depicted in FIG. 29, illustrating a slide groove of the flange.

As illustrated in FIGS. 29 and 30, the flanges 87 that hold both lateral ends of the fixing belt 21A in the longitudinal direction X thereof include slide grooves 87*a*, respectively. The slide groove 87*a* extends in a contact-separation direction in which the fixing belt 21A comes into contact with and separates from the pressure roller 22. The slide grooves 87*a* engage engagements mounted on the frame of the fixing device 83, respectively. As the engagements move relatively inside the slide grooves 87*a*, respectively, the fixing belt 21A moves in the contact-separation direction with respect to the pressure roller 22.

The technology of the present disclosure is also applied to fixing devices 20M, 20N, and 20P illustrated in FIGS. 31, 37, and 42 that have constructions described below, respectively.

Figure 31:
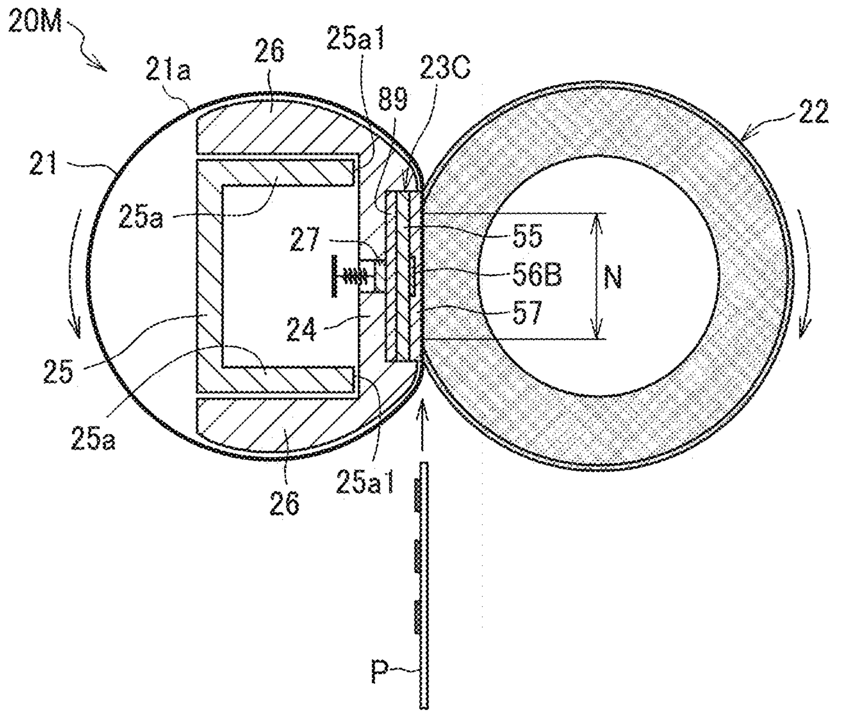
FIG. 31 is a schematic cross-sectional view of a fixing device according to yet another embodiment of the present disclosure that is installable in the image forming apparatus depicted in FIG. 1 or 24.

FIG. 31 is a schematic cross-sectional view of the fixing device 20M according to an embodiment of the present disclosure.

As illustrated in FIG. 31, the fixing device 20M according to the embodiment includes the fixing belt 21, the pressure roller 22, a heater 23C, the heater holder 24, the stay 25, the temperature sensors 27, and a first thermal conductor 89. The fixing belt 21 serves as a rotator or a fixing rotator. The pressure roller 22 serves as an opposed rotator or a pressure rotator. The heater 23C serves as a heat source. The heater holder 24 serves as a heat source holder. The stay 25 serves as a support. Each of the temperature sensors 27 (e.g., a thermistor) serves as a temperature detector. The first thermal conductor 89 serves as a thermal equalizer or a thermal conduction aid. The fixing belt 21 is an endless belt. The pressure roller 22 contacts the outer circumferential face 21*a* of the fixing belt 21 to form the fixing nip N between the fixing belt 21 and the pressure roller 22. The heater 23C heats the fixing belt 21. The heater holder 24 holds or supports the heater 23C and the first thermal conductor 89. The stay 25 supports the heater holder 24. Each of the temperature sensors 27 detects a temperature of the first thermal conductor 89. The fixing belt 21, the pressure roller 22, the heater 23C, the heater holder 24, the stay 25, and the first thermal conductor 89 extend in a longitudinal direction that is perpendicular to a paper surface in FIG. 31 and is parallel to the width direction of a sheet P conveyed through the fixing nip N, a belt width direction of the fixing belt 21, and the axial direction of the pressure roller 22.

Like the heater 23B depicted in FIG. 26, the heater 23C according to the embodiment includes a plurality of resistive heat generators 56B arranged in the longitudinal direction of the heater 23C with a gap between the adjacent resistive heat generators 56B. However, with the plurality of resistive heat generators 56B arranged with the gap between the adjacent resistive heat generators 56B, the heater 23C has a gap region disposed opposite the gap between the adjacent resistive heat generators 56B and a heat generator region disposed opposite the resistive heat generator 56B. The gap region is subject to a decreased temperature that is lower than an increased temperature of the heat generator region. Accordingly, the fixing belt 21 may also suffer from temperature decrease in a gap region thereon disposed opposite the gap region of the heater 23C, resulting in uneven temperature of the fixing belt 21 in the longitudinal direction thereof.

To address this circumstance, according to the embodiment, the fixing device 20M incorporates the first thermal conductor 89 that suppresses temperature decrease in the gap region of the fixing belt 21 and therefore suppresses uneven temperature of the fixing belt 21 in the longitudinal direction thereof.

A description is provided of a construction of the first thermal conductor 89 in detail.

As illustrated in FIG. 31, the first thermal conductor 89 is interposed between the heater 23C and the stay 25 in a horizontal direction in FIG. 31. Specifically, the first thermal conductor 89 is sandwiched between the heater 23C and the heater holder 24. For example, the first thermal conductor 89 has one face that contacts a back face of the base 55 of the heater 23C. The first thermal conductor 89 has another face (e.g., an opposite face opposite to the one face) that contacts the heater holder 24.

The stay 25 includes two perpendicular portions 25*a* that extend in a thickness direction of the heater 23C and the like. Each of the perpendicular portions 25*a* has a contact face 25*a*1 that contacts the heater holder 24, supporting the heater holder 24, the first thermal conductor 89, and the heater 23C. The contact faces 25*a*1 are disposed outboard from the resistive heat generators 56B in an orthogonal direction (e.g., a vertical direction in FIG. 31) perpendicular to the longitudinal direction of the stay 25. Thus, the stay 25 suppresses conduction of heat thereto from the heater 23C, causing the heater 23C to heat the fixing belt 21 efficiently.

Figure 32:
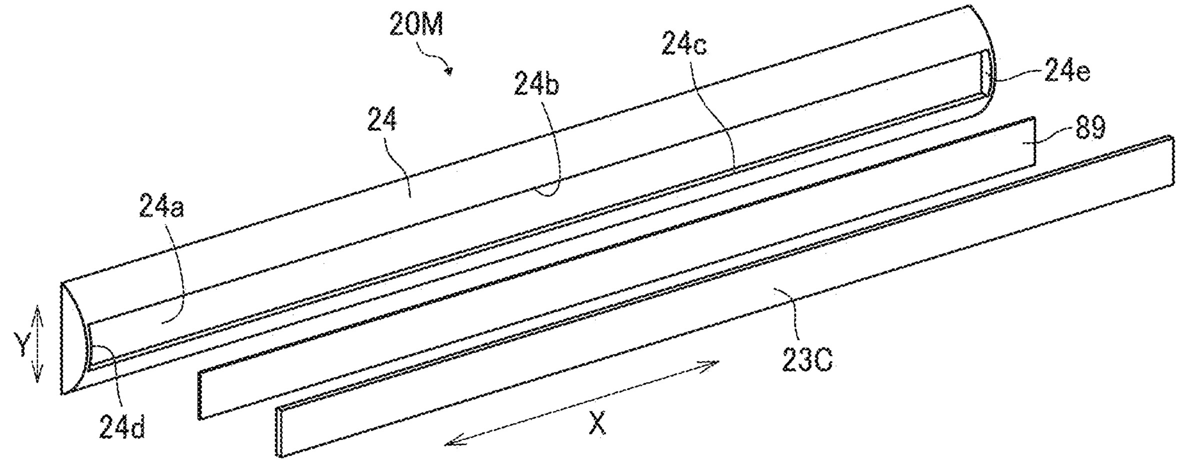
FIG. 32 is a perspective view of a heater, a first thermal conductor, and the heater holder incorporated in the fixing device depicted in FIG. 31.

As illustrated in FIG. 32, the first thermal conductor 89 is a plate having an even thickness. For example, the first thermal conductor 89 has a thickness of 0.3 mm, a length of 222 mm in the longitudinal direction X thereof, and a width of 10 mm in a direction (e.g., the short direction Y) perpendicular to the longitudinal direction X thereof. According to the embodiment, the first thermal conductor 89 is constructed of a single plate. Alternatively, the first thermal conductor 89 may be constructed of a plurality of members. FIG. 32 omits illustration of the guides 26 depicted in FIG. 31.

The first thermal conductor 89 is fitted to the recess 24*a* of the heater holder 24. The heater 23C is attached to the heater holder 24 from above the first thermal conductor 89. Thus, the heater holder 24 and the heater 23C sandwich and hold the first thermal conductor 89. According to the embodiment, the first thermal conductor 89 has a length in the longitudinal direction X thereof, which is equivalent to a length of the heater 23C in the longitudinal direction X thereof. The recess 24*a* includes the walls 24*d* and 24*e* (e.g., side walls) that extend in the orthogonal direction (e.g., the short direction Y) perpendicular to the longitudinal direction X of the first thermal conductor 89. The walls 24*d* and 24*e* serving as longitudinal direction restrictors, respectively, restrict motion of the first thermal conductor 89 and the heater 23C in the longitudinal direction X thereof. Thus, the walls 24*d* and 24*e* restrict shifting of the first thermal conductor 89 in the longitudinal direction X thereof inside the fixing device 20M, improving efficiency in conduction of heat in a target span in the longitudinal direction X of the first thermal conductor 89. The heater holder 24 further includes the walls 24*b* and 24*c* (e.g., side walls) that extend in the longitudinal direction X of the recess 24*a*. The walls 24*b* and 24*c*, serving as orthogonal direction restrictors, respectively, restrict motion of the first thermal conductor 89 and the heater 23C in the orthogonal direction (e.g., the short direction Y) perpendicular to the longitudinal direction X of the first thermal conductor 89.

Figure 33:
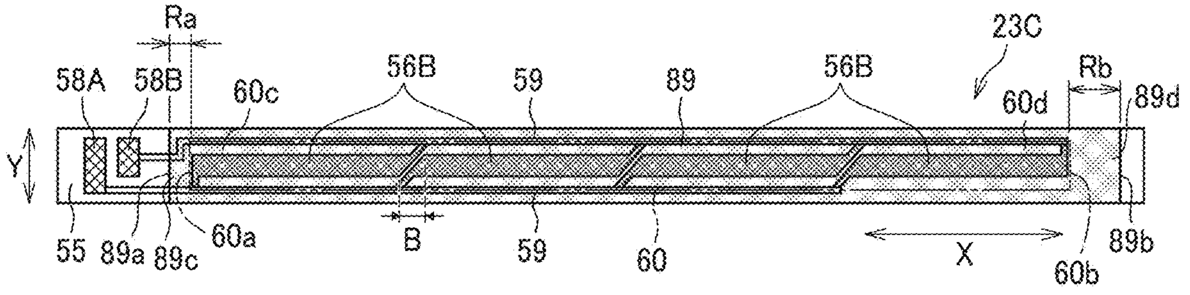
FIG. 33 is a plan view of the heater depicted in FIG. 32, illustrating an arrangement of the first thermal conductor.

As illustrated in FIG. 33, the first thermal conductor 89 includes an electrode side portion 89*c* that is disposed in proximity to the electrodes 58A and 58B and a non-electrode side portion 89*d* that is not disposed in proximity to the electrodes 58A and 58B. The first thermal conductor 89 that is hatched extends in a span in the longitudinal direction X thereof, that covers and extends beyond the heat generation portion 60 to the electrode side portion 89*c* and the non-electrode side portion 89*d*. With the construction of the fixing device 20M also, like in the embodiments described above, the electrode side portion 89*c* has the length Ra from the electrode side end 60*a* of the heat generation portion 60 to an electrode side end 89*a* of the first thermal conductor 89 in the longitudinal direction X of the base 55. The non-electrode side portion 89*d* has the length Rb from the non-electrode side end 60*b* of the heat generation portion 60 to a non-electrode side end 89*b* of the first thermal conductor 89 in the longitudinal direction X of the base 55. The length Ra is smaller than the length Rb. Accordingly, the first thermal conductor 89 balances an amount of heat between the electrode side portion 60*c* and the non-electrode side portion 60*d* of the heat generation portion 60. Consequently, the fixing device 20M suppresses uneven temperature. Alternatively, instead of differentiation of the length Ra of the electrode side portion 89*c* from the length Rb of the non-electrode side portion 89*d* of the first thermal conductor 89, the electrode side portion 89*c* may have a width or a thickness that is different from a width or a thickness of the non-electrode side portion 89*d*. Yet alternatively, two or three of the length, the width, and the thickness of the first thermal conductor 89 may be different between the electrode side portion 89*c* and the non-electrode side portion 89*d*.

Figure 34:
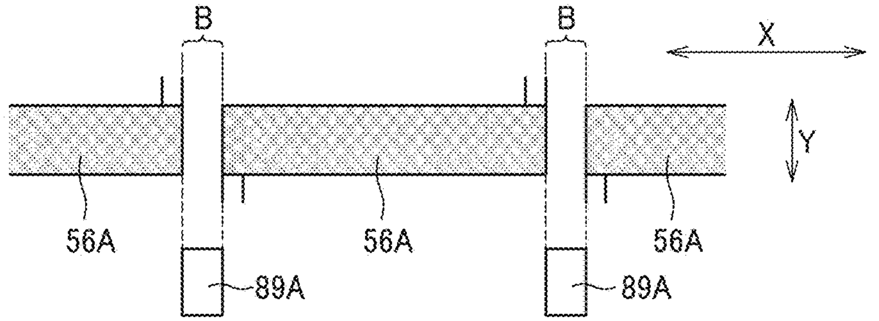
FIG. 34 is a plan view of a plurality of first thermal conductors as a variation of the first thermal conductor depicted in FIG. 33, illustrating an arrangement of the first thermal conductors.

FIG. 34 illustrates a plurality of first thermal conductors 89A as a variation of the first thermal conductor 89 depicted in FIG. 33. A part of the plurality of first thermal conductors 89A is disposed opposite an entire span of the gap B between the adjacent resistive heat generators 56A in the longitudinal direction X thereof. FIG. 34 illustrates the resistive heat generators 56A shifted from the first thermal conductors 89A vertically in FIG. 34 for convenience. Practically, the resistive heat generators 56A are substantially leveled with the first thermal conductors 89A in the short direction Y perpendicular to the longitudinal direction X of the resistive heat generators 56A. Alternatively, a first thermal conductor (e.g., the first thermal conductors 89 and 89A) may span a part of a resistive heat generator (e.g., the resistive heat generators 56A and 56B) in the short direction Y perpendicular to the longitudinal direction X of the resistive heat generator.

Figure 35:
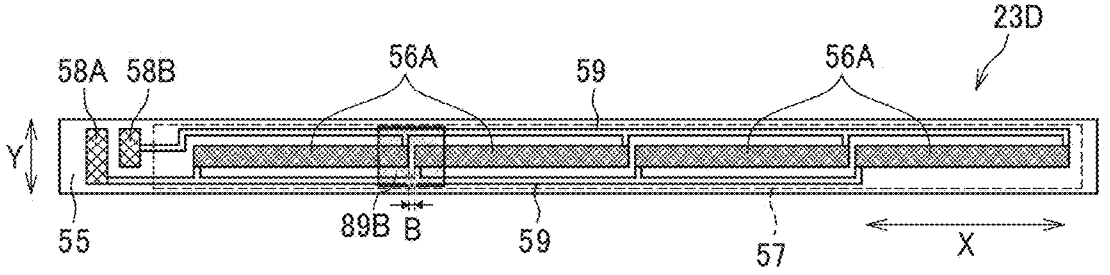
FIG. 35 is a plan view of a first thermal conductor as another variation of the first thermal conductor depicted in FIG. 33, illustrating an arrangement of the first thermal conductor.

FIG. 35 illustrates a heater 23D including the resistive heat generators 56A and a first thermal conductor 89B. The first thermal conductor 89B spans an entirety of the resistive heat generator 56A in the short direction Y perpendicular to the longitudinal direction X of the resistive heat generator 56A. Further, as illustrated in FIG. 35, the first thermal conductor 89B is disposed opposite and spans the gap B in the longitudinal direction X of the heater 23D. Additionally, the first thermal conductor 89B bridges the adjacent resistive heat generators 56A that sandwich the gap B. A state in which the first thermal conductor 89B bridges the adjacent resistive heat generators 56A denotes a state in which the first thermal conductor 89B overlaps the adjacent resistive heat generators 56A at least partially in the longitudinal direction X of the heater 23D. Alternatively, a plurality of first thermal conductors 89B may be disposed opposite a plurality of gaps B of the heater 23D, respectively. As illustrated in FIG. 35, one or more first thermal conductors 89B are disposed opposite a part of the plurality of gaps B. According to an embodiment depicted in FIG. 35, the single first thermal conductor 89B is disposed opposite the single gap B. A state in which the first thermal conductor 89A or 89B is disposed opposite the gap B denotes a state in which at least a part of the first thermal conductor 89A or 89B overlaps the gap B in the longitudinal direction X of the resistive heat generator 56A.

As illustrated in FIG. 31, as the pressure roller 22 applies pressure to the heater 23C, the heater 23C and the heater holder 24 sandwich the first thermal conductor 89 such that the first thermal conductor 89 contacts the heater 23C and the heater holder 24. As illustrated in FIG. 33, as the first thermal conductor 89 contacts the heater 23C, the first thermal conductor 89 conducts heat generated by the heater 23C in the longitudinal direction X thereof with improved efficiency. The first thermal conductor 89 is disposed opposite the gaps B arranged in the longitudinal direction X of the heater 23C. Thus, the first thermal conductor 89 improves efficiency in conduction of heat at the gaps B, increases an amount of heat conducted to the gaps B, and increases the temperature of the heater 23C at the gaps B. Accordingly, the first thermal conductor 89 suppresses uneven temperature of the heater 23C in the longitudinal direction X thereof, thereby suppressing uneven temperature of the fixing belt 21 in the longitudinal direction X thereof. Consequently, the fixing belt 21 suppresses uneven fixing and uneven gloss of a toner image fixed on a sheet P.

The heater 23C does not increase an amount of heat generation to attain sufficient fixing performance at the gaps B, causing the fixing device 20M to save energy. For example, if the fixing device 20M incorporates the first thermal conductor 89 that spans an entire region where the resistive heat generators 56B are arranged in the longitudinal direction X thereof, the first thermal conductor 89 improves efficiency in conduction of heat of the heater 23C in an entirety of a main heating span of the heater 23C disposed opposite an imaging span of a toner image formed on a sheet P conveyed through the fixing nip N. Accordingly, the first thermal conductor 89 suppresses uneven temperature of the heater 23C and the fixing belt 21 in the longitudinal direction X thereof.

The first thermal conductor 89 is coupled to the resistive heat generators 56B having a positive temperature coefficient (PTC) property, suppressing overheating of the fixing belt 21 in a non-conveyance span where the sheet P having the decreased size is not conveyed more effectively. The PTC property defines a property in which the resistance value increases as the temperature increases, for example, a heater output decreases under a given voltage. For example, the resistive heat generator 56B having the PTC property suppresses an amount of heat generation in the non-conveyance span effectively. Additionally, the first thermal conductor 89 efficiently conducts heat from the non-conveyance span on the fixing belt 21 that suffers from temperature increase to a sheet conveyance span on the fixing belt 21 where the sheet P is conveyed. The PTC property and heat conduction of the resistive heat generator 56B attain a synergistic effect that suppresses overheating of the fixing belt 21 in the non-conveyance span effectively.

Figure 36:
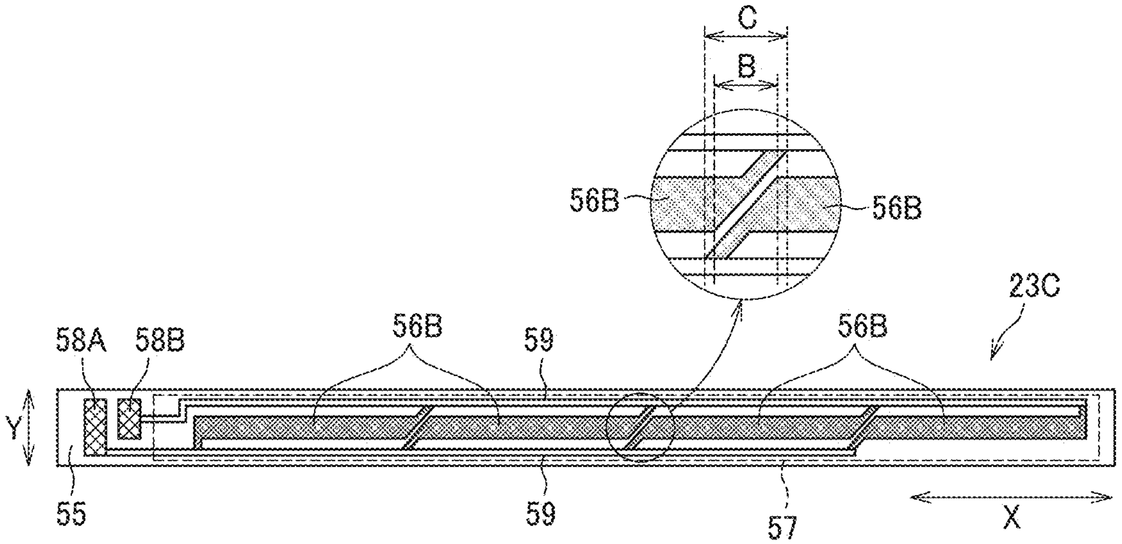
FIG. 36 is a plan view of the heater depicted in FIG. 33, illustrating a partially enlarged view thereof.

Since the heater 23C generates heat in a decreased amount at the gap B, the heater 23C has a decreased temperature also in a periphery of the gap B. To address this circumstance, the first thermal conductor 89 is preferably disposed also in the periphery of the gap B. For example, as illustrated in FIG. 36, the first thermal conductor 89 is disposed opposite an enlarged gap region C encompassing the periphery of the gap B. The first thermal conductor 89 improves efficiency in conduction of heat at the gap B and the periphery of the gap B in the longitudinal direction X of the heater 23C, suppressing uneven temperature of the heater 23C in the longitudinal direction X thereof more effectively. The first thermal conductor 89 spans the entire region where the resistive heat generators 56B are arranged in the longitudinal direction X of the heater 23C, suppressing uneven temperature of the heater 23C and the fixing belt 21 in the longitudinal direction X thereof more precisely.

Referring to FIGS. 37 to 41, a description is provided of a construction of the fixing device 20N according to an embodiment of the present disclosure.

Figure 37:
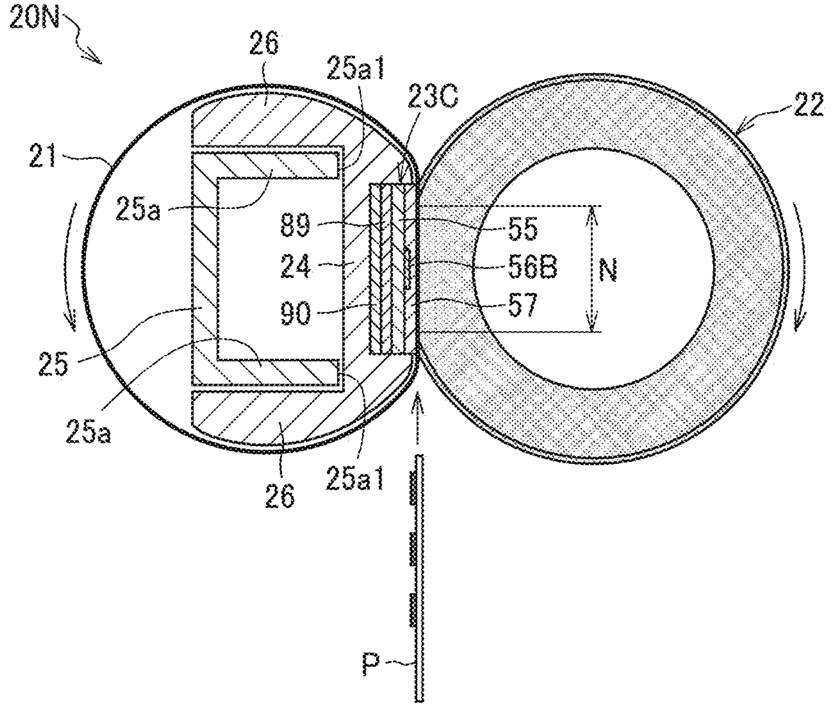
FIG. 37 is a schematic cross-sectional view of a fixing device according to yet another embodiment of the present disclosure that is installable in the image forming apparatus depicted in FIG. 1 or 24.
Figure 38:
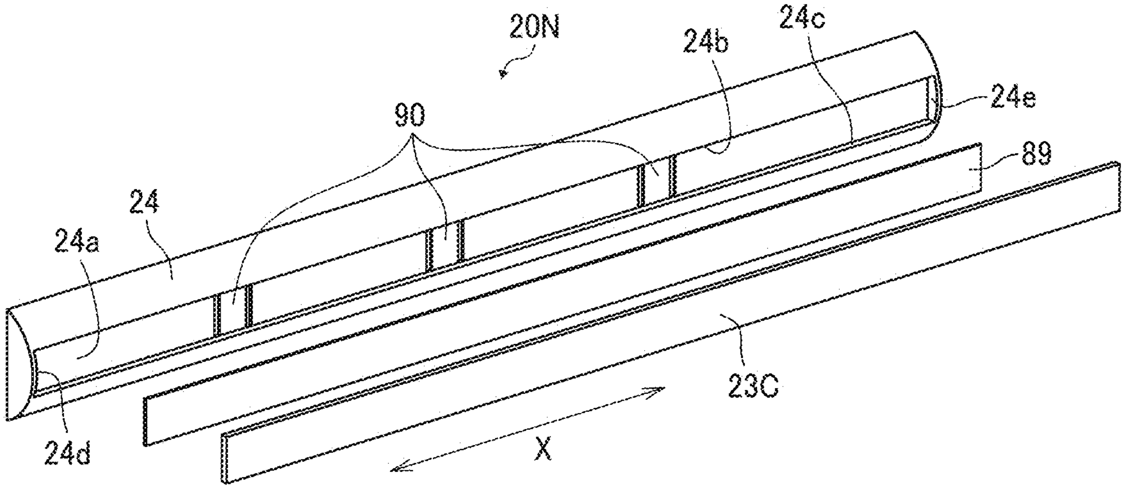
FIG. 38 is a perspective view of the heater, the first thermal conductor, a plurality of second thermal conductors, and the heater holder incorporated in the fixing device depicted in FIG. 37.

As illustrated in FIGS. 37 and 38, the fixing device 20N includes a plurality of second thermal conductors 90 interposed between the heater holder 24 and the first thermal conductor 89. The second thermal conductors 90 are disposed at a position different from a position of the first thermal conductor 89 in a laminating direction (e.g., a horizontal direction in FIG. 37) in which the stay 25, the heater holder 24, the second thermal conductors 90, the first thermal conductor 89, and the heater 23C are arranged. Specifically, the second thermal conductors 90 are layered on the first thermal conductor 89. Like the fixing device 20M depicted in FIG. 31, the fixing device 20N depicted in FIG. 37 incorporates the temperature sensors 27 (e.g., the thermistors) depicted in FIG. 31. FIG. 37 illustrates a cross section of the fixing device 20N in which the temperature sensors 27 are not disposed.

The second thermal conductors 90 are made of a material having a thermal conductivity greater than a thermal conductivity of the base 55. For example, the second thermal conductors 90 are made of graphene or graphite. According to the embodiment, each of the second thermal conductors 90 is a graphite sheet having a thickness of 1 mm. Alternatively, each of the second thermal conductors 90 may be a plate made of aluminum, copper, silver, or the like.

As illustrated in FIG. 38, the plurality of second thermal conductors 90 is placed in the recess 24*a* of the heater holder 24. The adjacent second thermal conductors 90 sandwich a gap in the longitudinal direction X of the heater holder 24. The heater holder 24 includes cavities placed with the second thermal conductors 90, respectively. The cavities are stepped down by one step from other portion of the heater holder 24. The second thermal conductor 90 and the heater holder 24 define clearances therebetween at both lateral ends of the second thermal conductor 90 in the longitudinal direction X of the heater holder 24. The clearances suppress conduction of heat from the second thermal conductor 90 to the heater holder 24, causing the heater 23C to heat the fixing belt 21 efficiently. FIG. 38 omits illustration of the guides 26 depicted in FIG. 37.

Figure 39:
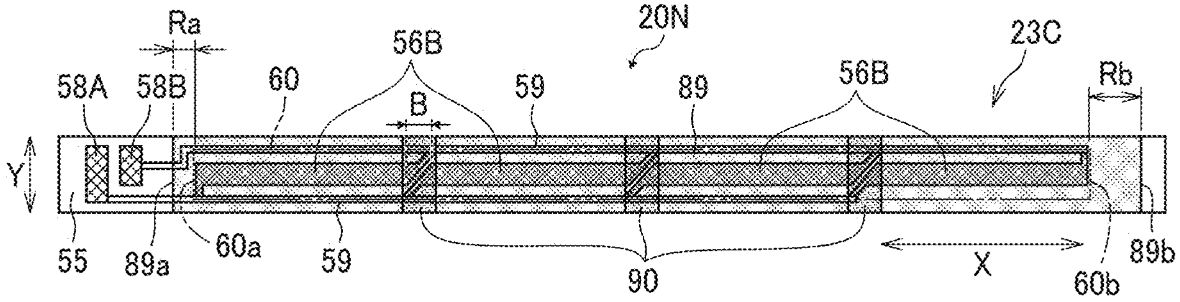
FIG. 39 is a plan view of the heater, the first thermal conductor, and the second thermal conductors depicted in FIG. 38, illustrating an arrangement of the first thermal conductor and the second thermal conductors.
Figure 41:
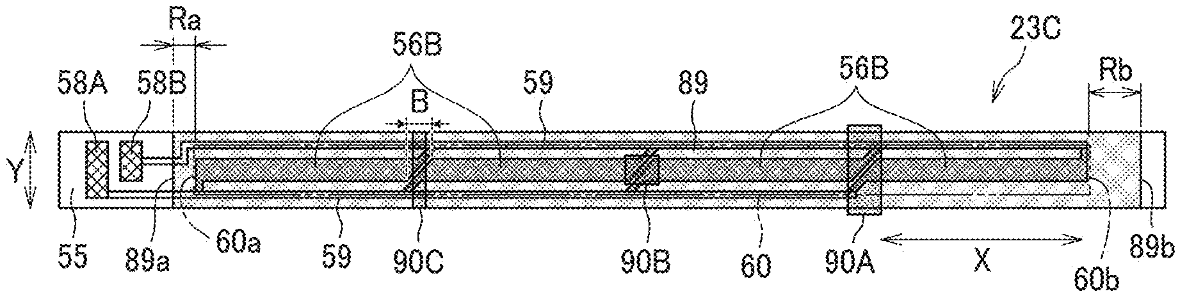
FIG. 41 is a plan view of a plurality of second thermal conductors as another variation of the second thermal conductors depicted in FIG. 39, illustrating an arrangement of the second thermal conductors.

As illustrated in FIG. 39, the second thermal conductor 90 that is hatched is disposed opposite the gap B between the adjacent resistive heat generators 56B and overlaps at least a part of the adjacent resistive heat generators 56B in the longitudinal direction X thereof. According to the embodiment, the second thermal conductor 90 spans an entirety of the gap B. FIG. 39 and FIG. 41 that is referred to in a description below illustrate the first thermal conductor 89 that spans the entire region where the resistive heat generators 56B are arranged in the longitudinal direction X thereof. Alternatively, the first thermal conductor 89 may span a region that is different from the region depicted in FIGS. 39 and 41.

The fixing device 20N according to the embodiment includes the second thermal conductors 90 in addition to the first thermal conductor 89. The second thermal conductor 90 is disposed opposite the gap B and overlaps at least a part of the adjacent resistive heat generators 56B in the longitudinal direction X thereof. The second thermal conductor 90 further improves efficiency in conduction of heat at the gap B in the longitudinal direction X of the heater 23C, suppressing uneven temperature of the heater 23C in the longitudinal direction X thereof more effectively.

Figure 40:
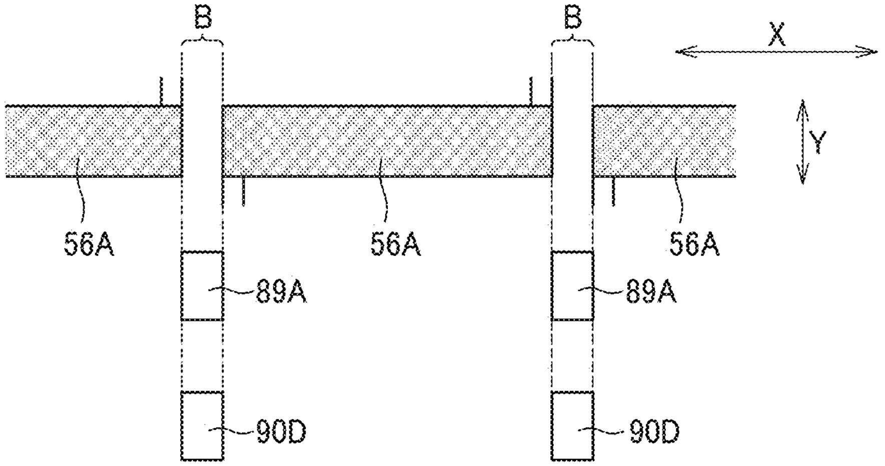
FIG. 40 is a plan view of a plurality of first thermal conductors and a plurality of second thermal conductors as a variation of the first thermal conductor and the second thermal conductors depicted in FIG. 39, illustrating an arrangement of the first thermal conductors and the second thermal conductors.

FIG. 40 illustrates the first thermal conductors 89A and a plurality of second thermal conductors 90D as a variation of the first thermal conductor 89 and the second thermal conductors 90 depicted in FIG. 39. A part of the first thermal conductors 89A and the second thermal conductors 90D is disposed opposite the entire span of the gap B in the longitudinal direction X of the resistive heat generator 56A. Accordingly, the first thermal conductor 89A and the second thermal conductor 90D improve efficiency in conduction of heat at the gap B compared to other region defined by the resistive heat generator 56A, which is other than the gap B. FIG. 40 illustrates the resistive heat generators 56A shifted from the first thermal conductors 89A and the second thermal conductors 90D vertically in FIG. 40 for convenience. Practically, the resistive heat generators 56A are substantially leveled with the first thermal conductors 89A and the second thermal conductors 90D in the short direction Y perpendicular to the longitudinal direction X of the resistive heat generators 56A. Alternatively, the first thermal conductors 89A and the second thermal conductors 90D may be disposed with respect to the resistive heat generators 56A with other arrangement. For example, the first thermal conductor 89A and the second thermal conductor 90D may span or cover a part or the entirety of the resistive heat generator 56A in the short direction Y perpendicular to the longitudinal direction X of the resistive heat generator 56A.

Each of the first thermal conductors 89 and 89A and the second thermal conductors 90 and 90D may be the graphene sheet. In this case, each of the first thermal conductors 89 and 89A and the second thermal conductors 90 and 90D has an enhanced thermal conductivity in a predetermined direction along a surface of the graphene sheet, that is, the longitudinal direction X, not a thickness direction of the graphene sheet. Accordingly, each of the first thermal conductors 89 and 89A and the second thermal conductors 90 and 90D suppresses uneven temperature of the heater 23C and the fixing belt 21 in the longitudinal direction X thereof effectively. Each of the first thermal conductors 89 and 89A and the second thermal conductors 90 and 90D may be made of a graphite sheet. A description of a configuration of each of the graphene sheet and the graphite sheet is provided below with reference to FIGS. 43 and 44.

The second thermal conductor 90 is disposed opposite the gap B between the adjacent resistive heat generators 56B and the enlarged gap region C depicted in FIG. 36 and overlaps at least a part of the adjacent resistive heat generators 56B in the longitudinal direction X of the heater 23C. Hence, the second thermal conductor 90 may be positioned with respect to the resistive heat generators 56B differently from the second thermal conductor 90 depicted in FIG. 39. For example, FIG. 41 illustrates second thermal conductors 90A, 90B, and 90C as a variation of the second thermal conductors 90 depicted in FIG. 39. The second thermal conductor 90A protrudes beyond the base 55 bidirectionally in the short direction Y perpendicular to the longitudinal direction X of the heater 23C. The second thermal conductor 90B is disposed opposite a span of the resistive heat generator 56B in the short direction Y of the heater 23C. The second thermal conductor 90C spans a part of the gap B.

Figure 42:
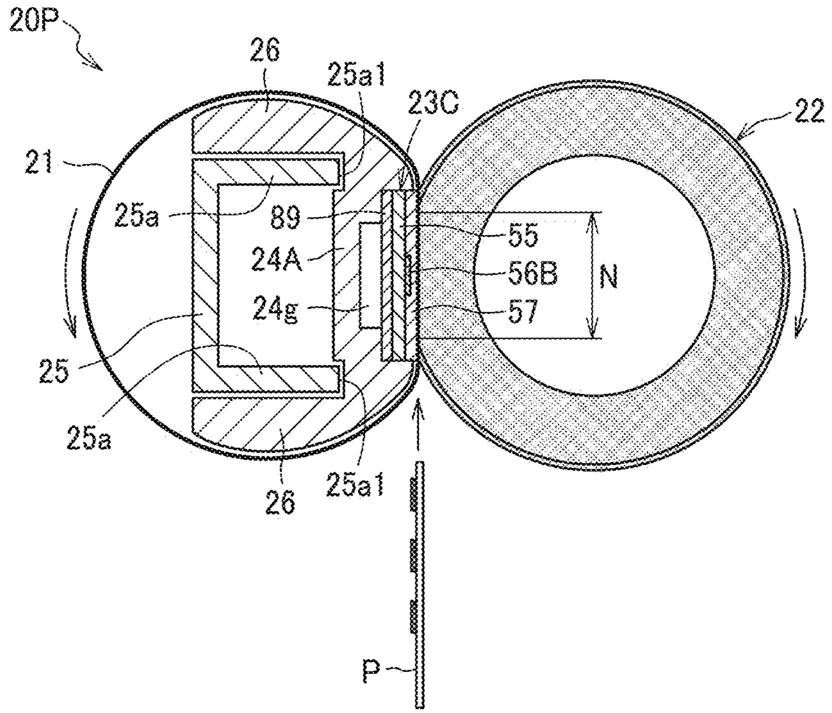
FIG. 42 is a schematic cross-sectional view of a fixing device according to yet another embodiment of the present disclosure that is installable in the image forming apparatus depicted in FIG. 1 or 24.

Referring to FIG. 42, a description is provided of a construction of the fixing device 20P according to an embodiment of the present disclosure.

As illustrated in FIG. 42, the fixing device 20P includes a heater holder 24A. The heater holder 24A and the first thermal conductor 89 define a clearance therebetween in a thickness direction of the heater holder 24A (e.g., a horizontal direction in FIG. 42). For example, the heater holder 24A includes the recess 24*a* depicted in FIG. 38 that accommodates the heater 23C, the first thermal conductor 89, and the second thermal conductors 90. The heater holder 24A includes a retracted portion 24*g* serving as a thermal insulation layer disposed at a part of the recess 24*a*. The retracted portion 24*g* is disposed at a part of the recess 24*a*, which is outboard from a portion of the recess 24*a*, which is placed with the second thermal conductor 90, in the longitudinal direction X of the heater holder 24A. FIG. 42 omits illustration of the second thermal conductor 90. A part of the recess 24*a* of the heater holder 24A is deepened compared to other part of the recess 24*a* to produce the retracted portion 24*g*. Accordingly, the heater holder 24A contacts the first thermal conductor 89 with a minimum contact area, suppressing conduction of heat from the first thermal conductor 89 to the heater holder 24A and causing the heater 23C to heat the fixing belt 21 efficiently. On a cross section that crosses a longitudinal direction of the fixing device 20P and is provided with the second thermal conductor 90, like in the fixing device 20N depicted in FIG. 37, the second thermal conductor 90 contacts the heater holder 24A.

The fixing device 20P according to the embodiment depicted in FIG. 42 includes the retracted portion 24*g* that spans an entirety of the resistive heat generator 56B in the short direction Y thereof (e.g., a vertical direction in FIG. 42). Accordingly, the retracted portion 24*g* suppresses conduction of heat from the first thermal conductor 89 to the heater holder 24A effectively, improving efficiency in heating of the fixing belt 21 by the heater 23C. Alternatively, instead of the retracted portion 24*g* that defines the clearance, the fixing device 20P may incorporate a thermal insulator that has a thermal conductivity smaller than a thermal conductivity of the heater holder 24A as the thermal insulation layer.

Figure 43:
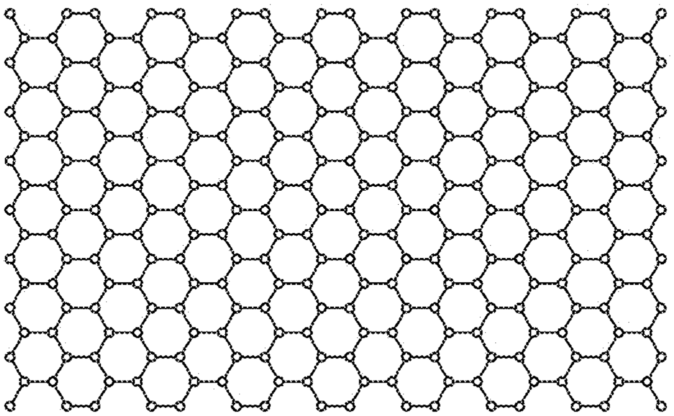
FIG. 43 is a diagram of a crystalline structure of atoms of graphene.
Figure 44:
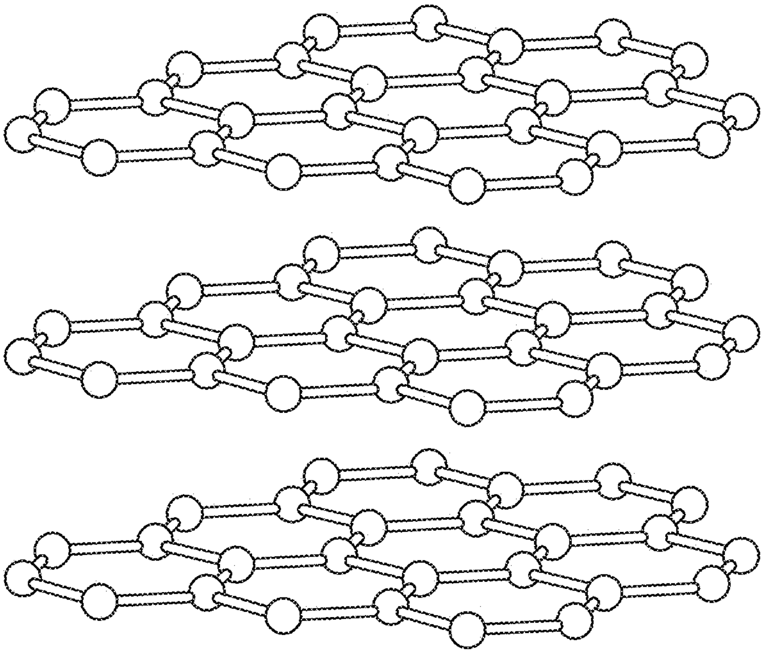
FIG. 44 is a diagram of a crystalline structure of atoms of graphite.

With reference to FIGS. 43 and 44, a description is provided of the configuration of each of the graphene sheet and the graphite sheet.

Graphene is thin powder. As illustrated in FIG. 43, graphene is constructed of a plane of carbon atoms arranged in a two-dimensional honeycomb lattice. The graphene sheet is graphene in a sheet form and is usually constructed of a single layer. The graphene sheet may contain impurities in the single layer of carbon atoms or may have a fullerene structure. The fullerene structure is generally recognized as a polycyclic compound constructed of an identical number of carbon atoms bonded to form a cage with fused rings of five and six atoms. For example, the fullerene structure is a closed cage structure formed of fullerene C60, C70, and C80, 3-coordinated carbon atoms, or the like.

The graphene sheet is artificial and is produced by chemical vapor deposition (CVD), for example.

The graphene sheet is commercially available. A size and a thickness of the graphene sheet and the number of layers and the like of a graphite sheet described below are measured with a transmission electron microscope (TEM), for example.

Graphite is constructed of stacked layers of graphene and is highly anisotropic in thermal conduction. As illustrated in FIG. 44, graphite has a plurality of layers, each of which is constructed of hexagonal fused rings of carbon atoms, that are bonded planarly. The plurality of layers defines a crystalline structure. In the crystalline structure, adjacent carbon atoms in the layer are bonded with each other by a covalent bond. Bonding between the layers of carbon atoms is established by the van der Waals bond. The covalent bond achieves bonding greater than bonding by the van der Waals bond. Graphite is highly anisotropic with bonding within the layer and bonding between the layers. For example, a first thermal conductor (e.g., the first thermal conductors 89, 89A, and 89B) or a second thermal conductor (e.g., the second thermal conductors 90, 90A, 90B, 90C, and 90D) is made of graphite. Accordingly, the first thermal conductor or the second thermal conductor attains an efficiency in conduction of heat in the longitudinal direction X thereof, which is greater than an efficiency in conduction of heat in a thickness direction, that is, the laminating direction (e.g., the horizontal direction in FIG. 37) in which the stay 25, the heater holder 24, the second thermal conductor 90, the first thermal conductor 89, and the heater 23C are arranged, thus suppressing conduction of heat to the heater holder 24. Consequently, the first thermal conductor or the second thermal conductor suppresses uneven temperature of the heater 23C in the longitudinal direction X thereof efficiently. Additionally, the first thermal conductor or the second thermal conductor minimizes heat conducted to the heater holder 24. The first thermal conductor or the second thermal conductor that is made of graphite attains enhanced heat resistance that inhibits oxidation at approximately 700 degrees Celsius.

The graphite sheet has a physical property and a dimension that are adjusted properly according to a function of the first thermal conductor or the second thermal conductor. For example, the graphite sheet is made of graphite having enhanced purity or single crystal graphite. The graphite sheet has an increased thickness to enhance anisotropic thermal conduction. In order to perform high speed fixing, the fixing devices 20M, 20N, and 20P employ the graphite sheet having a decreased thickness to decrease thermal capacity of the fixing devices 20M, 20N, and 20P. If the fixing nip N and the heater 23C have an increased width in the longitudinal direction X thereof, the first thermal conductor or the second thermal conductor also has an increased width in the longitudinal direction X thereof.

In view of increasing mechanical strength, the graphite sheet preferably has a number of layers that is not smaller than 11 layers. The graphite sheet may include a part constructed of a single layer and another part constructed of a plurality of layers.

According to the embodiment, a second thermal conductor (e.g., the second thermal conductors 90, 90A, 90B, 90C, and 90D) is provided separately from a first thermal conductor (e.g., the first thermal conductors 89, 89A, and 89B). Alternatively, the first thermal conductor may have other configuration. For example, the first thermal conductor may include an opposed portion that is disposed opposite the gap B and has a thickness greater than a thickness of an outboard portion of the first thermal conductor, which is other than the opposed portion. Thus, the first thermal conductor also achieves a function of the second thermal conductor.

The above describes the constructions of the fixing devices 20A, 20B, 20C, 20D, 20E, 20F, 20G, 20H, 20I, 20J, 20K, 20L, 20M, 20N, 20P, and 83 and the image forming apparatus 100A to which the technology of the present disclosure applied to the fixing device 20 and the image forming apparatus 100 is also applied. The fixing devices 20A, 20B, 20C, 20D, 20E, 20F, 20G, 20H, 20I, 20J, 20K, 20L, 20M, 20N, 20P, and 83 and the image forming apparatus 100A that are applied with the technology of the present disclosure achieve advantages similar to the advantages achieved by the fixing device 20 and the image forming apparatus 100 according to the embodiments of the present disclosure. For example, the fixing devices 20A, 20B, 20C, 20D, 20E, 20F, 20G, 20H, 20I, 20J, 20K, 20L, 20M, 20N, 20P, and 83 and the image forming apparatus 100A that are applied with the technology of the present disclosure suppress uneven temperature of the heaters 23, 23A, 23B, 23C, and 23D and the fixing belts 21 and 21A, thus improving quality of a toner image fixed on a sheet P.

The above describes the embodiments of the present disclosure applied to a fixing device (e.g., the fixing devices 20, 20A, 20B, 20C, 20D, 20E, 20F, 20G, 20H, 20I, 20J, 20K, 20L, 20M, 20N, 20P, and 83) including a heating device (e.g., the heating device 19). However, application of the embodiments of the present disclosure is not limited to the fixing device. Alternatively, the embodiments of the present disclosure may also be applied to a heating device such as a dryer that dries liquid such as ink applied on a sheet, a laminator that bonds film as a coating member onto a surface of a sheet by thermocompression, and a heat sealer that bonds sealing portions of a packaging material by thermocompression.

A description is provided of advantages of a heating device (e.g., the heating device 19) and a fixing device (e.g., the fixing devices 20, 20A, 20B, 20C, 20D, 20E, 20F, 20G, 20H, 20I, 20J, 20K, 20L, 20M, 20N, 20P, and 83).

As illustrated in FIGS. 2, 6, and 7, the heating device includes a first rotator (e.g., the fixing belts 21 and 21A and the belt 71), a heater (e.g., the heaters 23, 23A, 23B, 23C, and 23D), and a thermal conduction aid (e.g., the thermal equalization plates 28, 28A, 28B, 28C, 28D, 28E, 28F, and 28G). The fixing device includes the first rotator, the heater, the thermal conduction aid, and a second rotator (e.g., the pressure rollers 22 and 70 and the roller 73).

The first rotator rotates. The second rotator rotates and is disposed opposite or contacts an outer circumferential face (e.g., the outer circumferential faces 21*a* and 71*a*) of the first rotator to form a nip (e.g., the fixing nips N and N2 and the heating nip N1) between the first rotator and the second rotator. The heater heats the first rotator. The thermal conduction aid contacts the heater. The heater includes a base (e.g., the base 55) and a heat generation portion (e.g., the heat generation portion 60). The heat generation portion includes a heat generator (e.g., the resistive heat generators 56, 56A, and 56B) mounted on the base. The base includes a first lateral end portion (e.g., the mounting portion 55*c* and the one lateral end portion 55*f*) defined between one lateral end (e.g., the electrode side end 55*a*) of the base and one lateral end (e.g., the electrode side end 60*a*) of the heat generation portion in a longitudinal direction (e.g., the longitudinal direction X) of the base. The base further includes a second lateral end portion (e.g., the non-mounting portion 55*d* and the another lateral end portion 55*g*) defined between another lateral end (e.g., the non-electrode side end 55*b*) of the base and another lateral end (e.g., the non-electrode side end 60*b*) of the heat generation portion in the longitudinal direction of the base. The first lateral end portion of the base has a length La that is greater than a length Lb of the second lateral end portion of the base in the longitudinal direction of the base. The thermal conduction aid includes a first lateral end projection (e.g., the electrode side projections 281, 281A, 281B, and 281C) and a second lateral end projection (e.g., the non-electrode side projection 282) that project beyond the heat generation portion in the longitudinal direction of the base onto the first lateral end portion and the second lateral end portion of the base, respectively. For example, the first lateral end projection and the second lateral end projection are disposed opposite the first lateral end portion and the second lateral end portion, respectively. The first lateral end projection has a volume that is smaller than a volume of the second lateral end projection.

Accordingly, the heating device suppresses uneven temperature of the heater and the first rotator.

According to the embodiments described above, the fixing belt 21 serves as a first rotator. Alternatively, a fixing film, a fixing sleeve, or the like may be used as a first rotator. Further, the pressure roller 22 serves as a second rotator. Alternatively, a pressure belt or the like may be used as a second rotator.

According to the embodiments described above, the image forming apparatus 100 is a printer. Alternatively, the image forming apparatus 100 may be a copier, a facsimile machine, a multifunction peripheral (MFP) having at least two of copying, printing, scanning, facsimile, and plotter functions, an inkjet recording apparatus, or the like.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A heating device comprising:
a rotator configured to rotate;
a heater configured to heat the rotator;
the heater including:
a heat generation portion configured to generate heat; and
a base mounting the heat generation portion,
the base including:
a first lateral end portion defined between one lateral end of the base and one lateral end of the heat generation portion in a longitudinal direction of the base, the first lateral end portion having a first length in the longitudinal direction of the base; and
a second lateral end portion defined between another lateral end of the base and another lateral end of the heat generation portion in the longitudinal direction of the base, the second lateral end portion having a second length that is smaller than the first length of the first lateral end portion in the longitudinal direction of the base; and
a thermal conduction aid contacting the heater,
the thermal conduction aid including:
a first lateral end projection projecting beyond the heat generation portion in the longitudinal direction of the base onto the first lateral end portion of the base, the first lateral end projection having a first volume; and
a second lateral end projection projecting beyond the heat generation portion in the longitudinal direction of the base onto the second lateral end portion of the base, the second lateral end projection having a second volume that is greater than the first volume of the first lateral end projection.

2. The heating device according to claim 1,
wherein the heat generation portion includes at least one heat generator mounted on the base.

3. The heating device according to claim 2,
wherein the base has a mounting face mounting the at least one heat generator,
wherein the first lateral end projection has a first thickness in a direction perpendicular to the mounting face of the base,
wherein the second lateral end projection has a second thickness in the direction perpendicular to the mounting face of the base, and
wherein the first thickness of the first lateral end projection is smaller than the second thickness of the second lateral end projection.

4. The heating device according to claim 1,
wherein the thermal conduction aid has a contact face contacting the heater,
wherein the first lateral end projection has a first area seen in a direction perpendicular to the contact face and the second lateral end projection has a second area seen in the direction perpendicular to the contact face, and
wherein the first area of the first lateral end projection is smaller than the second area of the second lateral end projection.

5. The heating device according to claim 4,
wherein the first lateral end projection has a first length in the longitudinal direction of the base,
wherein the second lateral end projection has a second length in the longitudinal direction of the base, and
wherein the first length of the first lateral end projection is smaller than the second length of the second lateral end projection.

6. The heating device according to claim 4,
wherein the first lateral end projection has a first width in a direction perpendicular to the longitudinal direction of the base,
wherein the second lateral end projection has a second width in the direction perpendicular to the longitudinal direction of the base, and
wherein the first width of the first lateral end projection is smaller than the second width of the second lateral end projection.

7. The heating device according to claim 1,
wherein the thermal conduction aid is asymmetrical with respect to a center of the thermal conduction aid in the longitudinal direction of the base.

8. The heating device according to claim 1,
wherein the thermal conduction aid has a hole shifted from a center of the thermal conduction aid in the longitudinal direction of the base.

9. The heating device according to claim 8, further comprising a temperature detector configured to detect a temperature of the heater,
wherein the temperature detector is disposed inside the hole.

10. The heating device according to claim 9,
wherein the temperature detector includes a thermostat.

11. The heating device according to claim 9,
wherein the temperature detector includes a thermistor.

12. The heating device according to claim 8,
wherein the hole includes a through hole.

13. The heating device according to claim 8,
wherein the hole includes a bottom.

14. The heating device according to claim 1, further comprising:
a thermostat configured to detect a temperature of the heater; and
a thermistor configured to detect a temperature of the heater,
wherein the thermal conduction aid has a first hole and a second hole that are shifted from a center of the thermal conduction aid in the longitudinal direction of the base, and
wherein the thermostat is disposed inside the first hole and the thermistor is disposed inside the second hole.

15. The heating device according to claim 1,
wherein the thermal conduction aid further includes a recess.

16. The heating device according to claim 1,
wherein the first lateral end projection is triangular.

17. The heating device according to claim 1,
wherein the first lateral end projection includes a retracted portion having a first width in a direction perpendicular to the longitudinal direction of the base, and
wherein the second lateral end projection has a second width that is greater than the first width of the retracted portion in the direction perpendicular to the longitudinal direction of the base.

18. A fixing device comprising:
a first rotator configured to rotate;
a second rotator configured to rotate, the second rotator configured to contact an outer circumferential face of the first rotator to form a nip between the first rotator and the second rotator, the nip through which a recording medium bearing an image is conveyed;
a heater configured to heat the first rotator;
the heater including:
a heat generation portion configured to generate heat; and
a base mounting the heat generation portion,
the base including:
a first lateral end portion defined between one lateral end of the base and one lateral end of the heat generation portion in a longitudinal direction of the base, the first lateral end portion having a first length in the longitudinal direction of the base; and
a second lateral end portion defined between another lateral end of the base and another lateral end of the heat generation portion in the longitudinal direction of the base, the second lateral end portion having a second length that is smaller than the first length of the first lateral end portion in the longitudinal direction of the base; and
a thermal conduction aid contacting the heater,
the thermal conduction aid including:
a first lateral end projection projecting beyond the heat generation portion in the longitudinal direction of the base onto the first lateral end portion of the base, the first lateral end projection having a first volume; and
a second lateral end projection projecting beyond the heat generation portion in the longitudinal direction of the base onto the second lateral end portion of the base, the second lateral end projection having a second volume that is greater than the first volume of the first lateral end projection.

19. The fixing device according to claim 18,
wherein the first rotator includes a belt and the second rotator includes a roller.

20. An image forming apparatus comprising:
an image forming device configured to form an image; and
a heating device configured to heat a recording medium bearing the image,
the heating device including:
a rotator configured to rotate;
a heater configured to heat the rotator;
the heater including:
a heat generation portion configured to generate heat; and
a base mounting the heat generation portion,
the base including:
a first lateral end portion defined between one lateral end of the base and one lateral end of the heat generation portion in a longitudinal direction of the base, the first lateral end portion having a first length in the longitudinal direction of the base; and
a second lateral end portion defined between another lateral end of the base and another lateral end of the heat generation portion in the longitudinal direction of the base, the second lateral end portion having a second length that is smaller than the first length of the first lateral end portion in the longitudinal direction of the base; and
a thermal conduction aid contacting the heater,
the thermal conduction aid including:
a first lateral end projection projecting beyond the heat generation portion in the longitudinal direction of the base onto the first lateral end portion of the base, the first lateral end projection having a first volume; and
a second lateral end projection projecting beyond the heat generation portion in the longitudinal direction of the base onto the second lateral end portion of the base, the second lateral end projection having a second volume that is greater than the first volume of the first lateral end projection.

* * * * *